(12) United States Patent
Cho et al.

(10) Patent No.: US 10,863,435 B2
(45) Date of Patent: Dec. 8, 2020

(54) ELECTRONIC DEVICE AND METHOD FOR CONTROLLING COMMUNICATION THEREOF

(71) Applicant: Samsung Electronics Co., Ltd., Gyeonggi-do (KR)

(72) Inventors: Youngha Cho, Gyeonggi-do (KR); Sungjun Kim, Gyeonggi-do (KR); Boram Namgoong, Gyeonggi-do (KR); Youngsup Shin, Gyeonggi-do (KR); Seunghyuk Yu, Seoul (KR); Yongseob Yun, Gyeonggi-do (KR); Gwanghui Lee, Gyeongsangbuk-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 15/903,245

(22) Filed: Feb. 23, 2018

(65) Prior Publication Data

US 2018/0249409 A1  Aug. 30, 2018

(30) Foreign Application Priority Data

Feb. 24, 2017  (KR) .......................... 10-2017-0025035

(51) Int. Cl.
*H04W 52/02* (2009.01)
*H04L 29/08* (2006.01)
*H04W 4/021* (2018.01)

(52) U.S. Cl.
CPC ......... *H04W 52/0216* (2013.01); *H04L 67/12* (2013.01); *H04W 4/021* (2013.01); *Y02D 30/70* (2020.08)

(58) Field of Classification Search
CPC ...... H04L 67/12; H04W 4/021; H04W 24/10; H04W 52/0209; H04W 52/0216;
(Continued)

(56) References Cited

U.S. PATENT DOCUMENTS

2006/0142974 A1  6/2006  Scott et al.
2006/0262011 A1  11/2006  Bull et al.
(Continued)

FOREIGN PATENT DOCUMENTS

KR  10-2017-0017351 A  2/2017
WO  2011/022412 A1  2/2011
(Continued)

OTHER PUBLICATIONS

International Search Report dated Jun. 4, 2018.
European Search Report dated Nov. 4, 2019.

*Primary Examiner* — Khoa Huynh
(74) *Attorney, Agent, or Firm* — Cha & Reiter, LLC.

(57) ABSTRACT

A communication control method of an electronic device includes operating the electronic device in a first mode having a first operating cycle, and measuring a location of the electronic device. The method further includes, based on a result of measuring the location of the electronic device, and while in a first measuring cycle, determining whether the electronic device is located within at least one predetermined area. Also, the method includes changing the first operating cycle of the first mode or the first measuring cycle of the electronic device when the electronic device is located within the at least one predetermined area. The at least one predetermined area is at least one of a geo-fence and a communication accessible area.

23 Claims, 12 Drawing Sheets

(58) Field of Classification Search
CPC ... H04W 52/0245; Y02D 70/00; Y02D 70/10; Y02D 70/1242; Y02D 70/1262; Y02D 70/14; Y02D 70/142; Y02D 70/144; Y02D 70/164; Y02D 70/166; Y02D 70/168; Y02D 70/20; Y02D 70/24; Y02D 70/26; Y02D 30/70
See application file for complete search history.

(56) References Cited

U.S. PATENT DOCUMENTS

| | | | |
|---|---|---|---|
| 2008/0132298 A1 | 6/2008 | Roh et al. | |
| 2011/0133888 A1 | 6/2011 | Stevens et al. | |
| 2011/0171909 A1 | 7/2011 | Jung et al. | |
| 2013/0188503 A1* | 7/2013 | Anepu | H04W 24/10 370/252 |
| 2013/0210425 A1* | 8/2013 | Nagaraj | H04W 52/0229 455/432.1 |
| 2014/0247742 A1* | 9/2014 | Lee | H04W 52/0216 370/252 |
| 2014/0302879 A1 | 10/2014 | Kim et al. | |
| 2015/0181526 A1* | 6/2015 | Lee | H04W 52/0241 370/311 |
| 2016/0174150 A1 | 6/2016 | Comsa et al. | |
| 2017/0006149 A1 | 1/2017 | Namgoong et al. | |
| 2017/0318536 A1* | 11/2017 | Manepalli | H04W 52/0245 |

FOREIGN PATENT DOCUMENTS

| | | |
|---|---|---|
| WO | 2013/035984 A1 | 3/2013 |
| WO | 2016/137475 A1 | 9/2016 |

\* cited by examiner

ELECTRONIC DEVICE AND METHOD FOR CONTROLLING COMMUNICATION THEREOF

CROSS-REFERENCE TO RELATED APPLICATION(S)

This application is based on and claims priority under 35 U.S.C. § 119 to Korean Patent Application No. 10-2017-0025035, filed on Feb. 24, 2017, in the Korean Intellectual Property Office, the disclosure of which is incorporated by reference herein in its entirety.

TECHNICAL FIELD

The present disclosure generally relates to a communication control method and an electronic device implementing the method.

BACKGROUND

The term "Internet of Things (IoT)" first appeared at the MIT Auto-ID Lab in 1998. In 2005, The ITU Telecommunication Standardization Sector (ITU-T) published its annual report "The Internet of Things" which predicted that the Internet would be the basic framework for various types of information technology (IT). This report defined IoT as a new information and communication infrastructure that enables communication between people and things (e.g. devices) and between things themselves anytime and anywhere through a network that connected people and things. In other words, IoT may be understood as an infrastructure where ubiquitous intelligent computing devices having specific functions exist in an environment.

In addition, IoT services are techniques that provide additional conveniences to the users. Today, many mobile communication operators and device manufacturers are concentrating on the development of IoT devices and services.

SUMMARY

Various embodiments of the present disclosure provide an electronic device that may be used as an IoT device, and a communication control method thereof for dynamically changing the communication activating cycle and the location measuring cycle of the device.

According to embodiments, a communication control method of an electronic device may comprise operating the electronic device in a first mode having a first operating cycle; measuring a location of the electronic device; based on a result of measuring the location of the electronic device, and while in a first measuring cycle, determining whether the electronic device is located within at least one predetermined area; and changing the first operating cycle of the first mode or the first measuring cycle of the electronic device when the electronic device is located within the at least one predetermined area, wherein the at least one predetermined area is at least one of a geo-fence and a communication accessible area.

According to embodiments, an electronic device may comprise a motion sensor; a communication module; a processor; and a memory, wherein the memory stores instructions that, when executed by the processor, cause the processor to operate the electronic device in a first mode having a first operating cycle, to measure a location of the electronic device through the communication module, based on a result of measuring the location of the electronic device, and while in a first measuring cycle, to determine whether the electronic device is located within at least one predetermined area, and to change the first operating cycle of the first mode or the first measuring cycle of the electronic device when the electronic device is located within the at least one predetermined area, and wherein the at least one predetermined area is at least one of a geo-fence and a communication accessible area.

According to embodiments, by dynamically changing the communication activating cycle and the location measuring cycle of the electronic device, it is possible to reduce power consumption of the electronic device.

BRIEF DESCRIPTION OF THE DRAWINGS

The above and other aspects, features, and advantages of certain embodiment of the present disclosure will be more apparent from the following description taken in conjunction with the accompanying drawings, in which.

DETAILED DESCRIPTION

Figure 1:
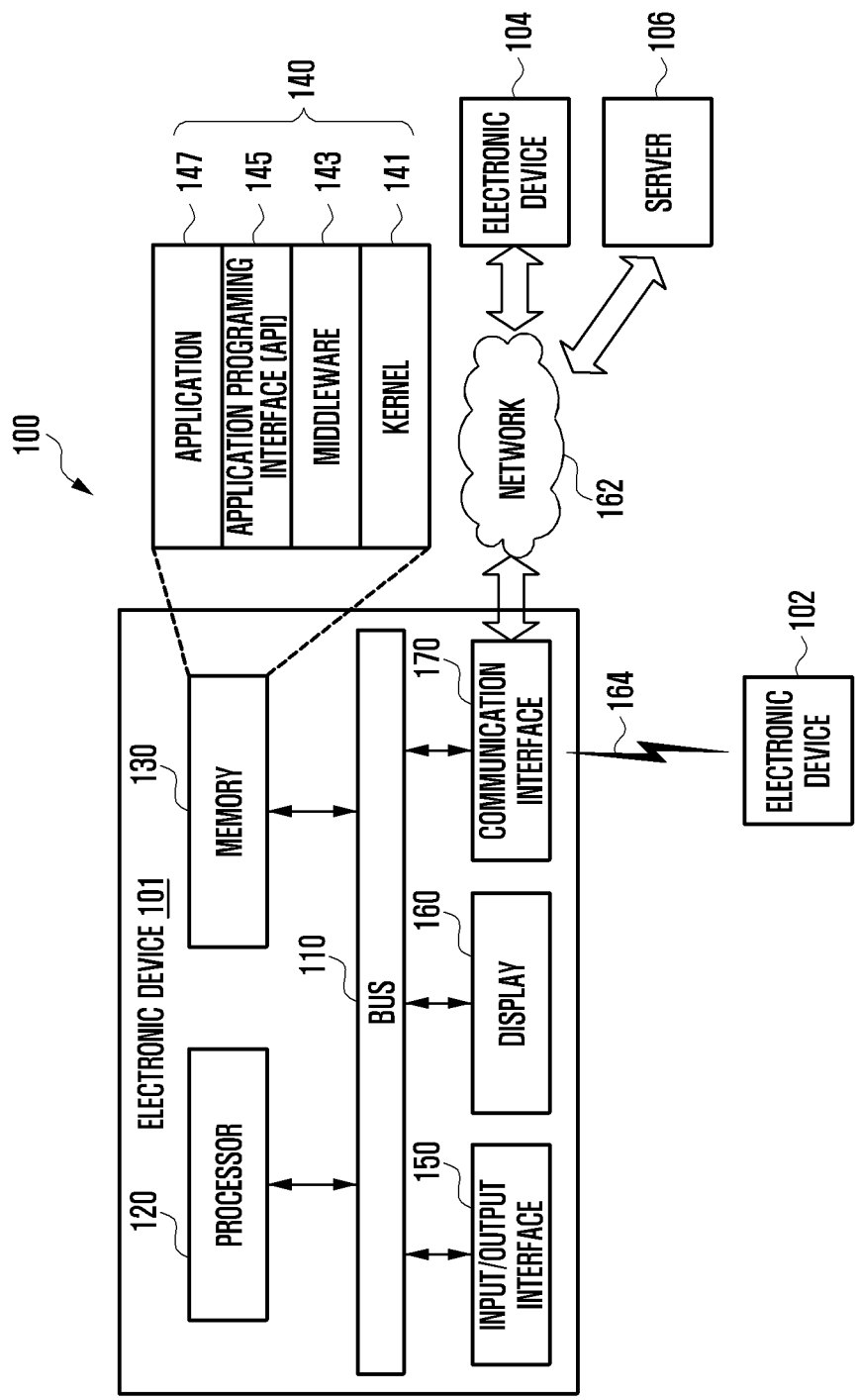
FIG. 1 is a diagram illustrating a network environment including an electronic device according to an embodiment.

Hereinafter, the present disclosure will be described with reference to the accompanying drawings. Although specific embodiments are illustrated in the drawings and related detailed descriptions are discussed in the present specification, the present disclosure may have various modifications and equivalents not explicitly disclosed. In any case, various embodiments of the present disclosure are not limited to specific disclosed implementations and it should be understood that the present disclosure includes all changes, equivalents and substitutes included in the spirit and scope of the present disclosure. In connection with descriptions of the drawings, similar components are designated by the same reference numeral.

The term "include" or "may include," which may be used in describing various embodiments of the present disclosure, refers to the existence of a corresponding disclosed function, operation or component but does not limit one or more additional functions, operations, or components. In various embodiments of the present disclosure, the terms such as "include" or "have" may be construed to indicate the presence of a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

As used herein, the terms "1st" or "first" and "2nd" or "second" may refer to corresponding components without implying an order of importance, and are used merely to distinguish each component from the others without unduly limiting the components. For example, a first user device and a second user device indicate different user devices although both of them are user devices. Thus, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure. Singular forms of a term may also refer to the plural unless the context clearly indicates otherwise.

Unless explicitly defined otherwise, terms such as technical terms and scientific terms have the same meaning as those generally understood by a person skilled in the art. Further, it should be understood that when applicable, terms should be given their contextual meanings in the relevant art.

An electronic device according to various embodiments of the present disclosure may be a device that performs communication functions. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD) such as electronic glasses, electronic clothes, and electronic bracelet, an electronic necklace, an electronic appcessary, an electronic tattoo, and a smart watch.

According to some embodiments, the electronic device may be a smart home appliance having a communication function. The smart home appliance may include at least one of a Television (TV), a Digital Video Disk (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to some embodiments, the electronic device may include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Navigation Satellite System (GNSS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

According to one embodiment of the present disclosure, a screen of an electronic device may be split into at least two windows according to a predefined split manner and displayed through a display of an electronic device. The windows are defined as split windows. According to one embodiment, the split windows are defined as windows displayed on a display of an electronic display not to be superposed one on another.

According to one embodiment, a popup window is defined as a window displayed on a display of an electronic device to hide or to be superposed on a portion of a screen under execution.

According to one embodiment of the present disclosure, an electronic device using split window and a popup window is capable of displaying two or more application execution screens or function execution screens. Thus, the split windows and the popup window are defined as a multi-window.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment 10 including an electronic device 101 according to an embodiment of the present disclosure. Referring to FIG. 1, the electronic device 100 includes a bus 110, a processor 120, a memory 130, an input/output interface 150, a display 160 and a communication interface 170.

The bus 110 may be a circuit connecting the above described components and transmitting communication (for example, a control message) between the above described components. The processor 120 receives commands from other components (for example, the memory 130, the input/output interface 150, the display 160, the communication interface 170) through the bus 110, analyzes the received commands, and executes calculation or data processing according to the analyzed commands. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The memory 130 stores commands or data received from the processor 120 or other components (for example, the input/output interface 150, the display 160, or the communication interface 170) or generated by the processor 120 or other components. The memory 130 may include programming modules 140, for example, a kernel 141, middleware 143, an Application Programming Interface (API) 145, and an application 147. Each of the aforementioned programming modules may be implemented by software, firmware, hardware, or a combination of two or more thereof.

The kernel 141 controls or manages system resources (for example, the bus 110, the processor 120, or the memory 130) used for executing an operation or function implemented by the remaining other programming modules, for example, the middleware 143, the API 145, or the application 147. Further, the kernel 141 provides an interface for accessing individual components of the electronic device 101 from the middleware 143, the API 145, or the application 147 to control or manage the components. The middleware 143 performs a relay function of allowing the API 145 or the application 147 to communicate with the kernel 141 to exchange data. Further, in operation requests received from the application 147, the middleware 143 performs a control for the operation requests (for example, scheduling or load balancing) by using a method of assigning a priority, by which system resources (for example, the bus 110, the processor 120, the memory 130 and the like) of the electronic device 100 can be used, to the application 134.

The API 145 is an interface by which the application 147 can control a function provided by the kernel 141 or the middleware 143 and includes, for example, at least one interface or function (for example, command) for a file control, a window control, image processing, or a character control. The input/output interface 150 can receive, for example, a command and/or data from a user, and transfer the received command and/or data to the processor 120 and/or the memory 130 through the bus 110. The display 160 can display an image, a video, and/or data to a user.

According to an embodiment, the display 160 may display a graphic user interface image for interaction between the user and the electronic device 100. According to various embodiments, the graphic user interface image may include interface information to activate a function for correcting color of the image to be projected onto the screen. The interface information may be in the form of, for example, a button, a menu, or an icon. The communication interface 170 connects communication between the electronic device 100 and the external device (for example, electronic device 102, 104 or server 106). For example, the communication interface 170 may access a network 162 through wireless or wired communication to communicate with the external device. The wireless communication includes at least one of, for example, WiFi, BlueTooth (BT), Near Field Communication (NFC), a Global Navigation Satellite System (GNSS), and cellular communication (for example, LTE, LTE-A, CDMA, WCDMA, UMTS, WiBro or GSM). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the server 106 supports driving of the electronic device 100 by performing at least one operation (or function) implemented by the electronic device 100. For example, the server 106 may include a communication control server module that supports the communication interface 170 implemented in the electronic device 100. For example, the communication control server module may include at least one of the components of the communication interface 170 to perform (on behalf of) at least one operations performed by the communication interface 170.

Figure 2:
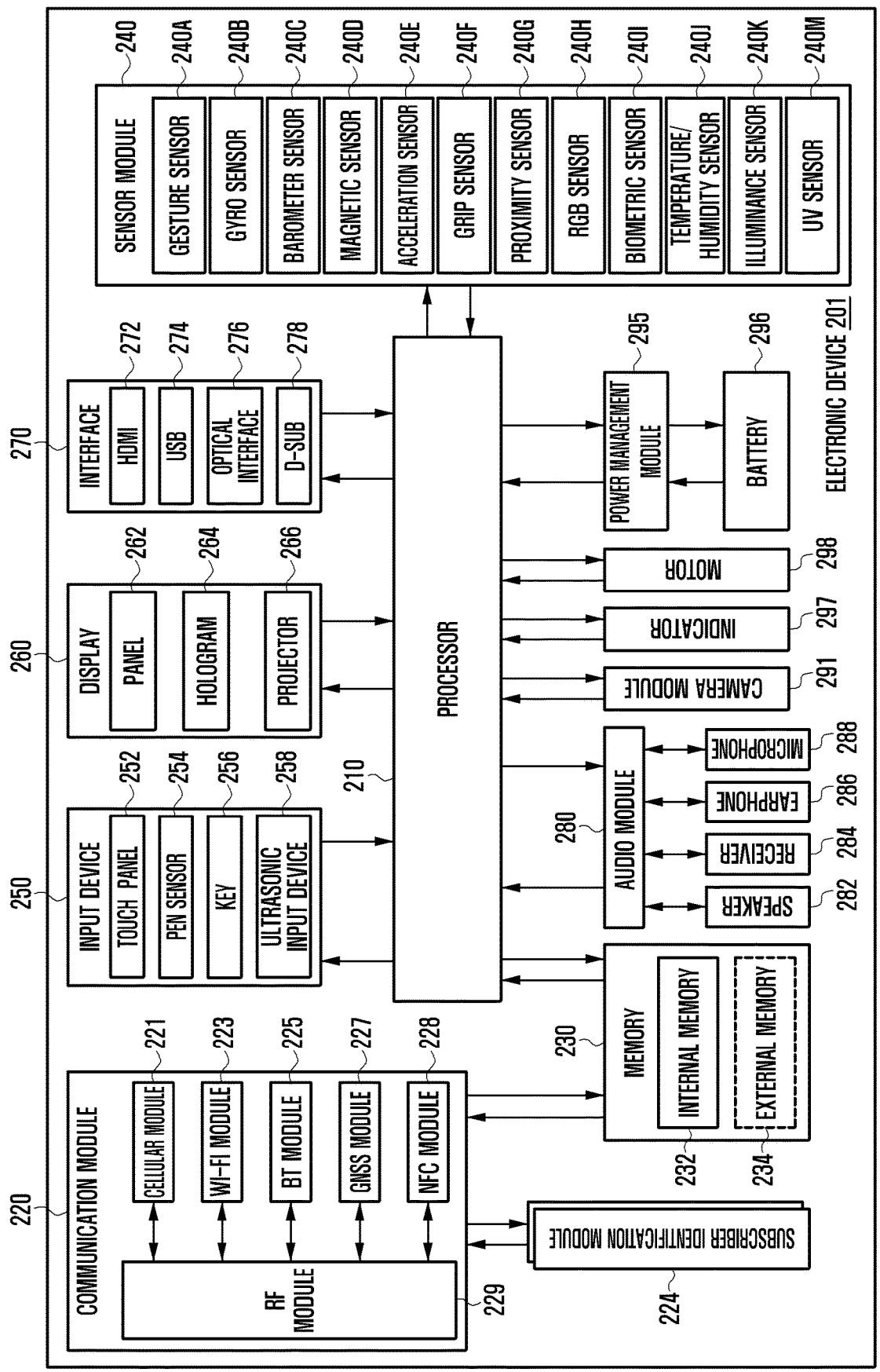
FIG. 2 is a block diagram illustrating an electronic device according to an embodiment.

FIG. 2 is a block diagram of an electronic device 200 according to an embodiment of the present disclosure. The electronic device 200 may configure, for example, a whole or a part of the electronic device 100 illustrated in FIG. 1. Referring to FIG. 2, the electronic device 200 includes one or more Application Processors (APs) 210, a communication interface 220, a Subscriber Identification Module (SIM) card 224, a memory 230, a sensor module 240, an input device 250, a display 260, an interface 270, an audio module 280, a camera module 291, a power managing module 295, a battery 296, an indicator 297, and a motor 298.

The AP 210 operates an operating system (OS) or an application program so as to control a plurality of hardware or software component elements connected to the AP 210 and execute various data processing and calculations including multimedia data. The AP 210 may be implemented by, for example, a System on Chip (SoC). According to an embodiment, the processor 210 may further include a Graphic Processing Unit (GPU).

The communication interface 220 (for example, communication interface 170) transmits/receives data in communication between different electronic devices (for example, the electronic device 104 and the server 106) connected to the electronic device 200 (for example, electronic device 100) through a network. According to an embodiment, the communication interface 220 includes a cellular module 221, a WiFi module 223, a BlueTooth (BT) module 225, a Global Navigation Satellite System (GNSS) module 227, a Near Field Communication (NFC) module 228, and a Radio Frequency (RF) module 229.

The cellular module 221 provides a voice, a call, a video call, a Short Message Service (SMS), or an Internet service through a communication network (for example, Long Term Evolution (LTE), LTE-A, Code Division Multiple Access (CDMA), Wideband CDMA (WCDMA), UMTS, WiBro, GSM or the like). Further, the cellular module 221 may distinguish and authenticate electronic devices within a communication network by using a subscriber identification module (for example, the SIM card 224). According to an embodiment, the cellular module 221 performs at least some of the functions which can be provided by the AP 210. For example, the cellular module 221 may perform at least some of the multimedia control functions.

According to an embodiment, the cellular module 221 may include a Communication Processor (CP). Further, the cellular module 221 may be implemented by, for example, an SoC.

According to an embodiment, the AP 210 or the cellular module 221 (for example, communication processor) may load a command or data received from at least one of a non-volatile memory and other components connected to each of the AP 210 and the cellular module 221 to a volatile memory and process the loaded command or data. Further, the AP 210 or the cellular module 221 may store data received from at least one of other components or generated by at least one of other components in a non-volatile memory.

Each of the WiFi module 223, the BT module 225, the GNSS module 227, and the NFC module 228 may include, for example, a processor for processing data transmitted/received through the corresponding module. Although the cellular module 221, the WiFi module 223, the BT module 225, the GNSS module 227, and the NFC module 228 are illustrated as blocks separate from each other in FIG. 8, at least some (for example, two or more) of the cellular module 221, the WiFi module 223, the BT module 225, the GNSS module 227, and the NFC module 228 may be included in one Integrated Chip (IC) or one IC package according to one embodiment. For example, at least some (for example, the communication processor corresponding to the cellular module 221 and the WiFi processor corresponding to the WiFi module 223) of the processors corresponding to the cellular module 221, the WiFi module 223, the BT module 225, the GNSS module 227, and the NFC module 228 may be implemented by one SoC.

The RF module 229 transmits/receives data, for example, an RF signal. Although not illustrated, the RF module 229 may include, for example, a transceiver, a Power Amp Module (PAM), a frequency filter, a Low Noise Amplifier (LNA) or the like. Further, the RF module 229 may further include a component for transmitting/receiving electronic waves over a free air space in wireless communication, for example, a conductor, a conducting wire, or the like. Although the cellular module 221, the WiFi module 223, the BT module 225, the GNSS module 227, and the NFC module 228 share one RF module 229 in FIG. 2, at least one of the cellular module 221, the WiFi module 223, the BT module 225, the GNSS module 227, and the NFC module 228 may transmit/receive an RF signal through a separate RF module according to one embodiment.

The SIM card 224 is a card including a Subscriber Identification Module and may be inserted into a slot formed in a particular portion of the electronic device. The SIM card 224 includes unique identification information (for example, Integrated Circuit Card IDentifier (ICCID)) or subscriber information (for example, International Mobile Subscriber Identity (IMSI).

The memory 230 (for example, memory 130) may include an internal memory 232 or an external memory 234. The internal memory 232 may include, for example, at least one of a volatile memory (for example, a Random Access Memory (RAM), a dynamic RAM (DRAM), a static RAM (SRAM), a synchronous dynamic RAM (SDRAM), and the like), and a non-volatile Memory (for example, a Read Only Memory (ROM), a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

According to an embodiment, the internal memory 232 may be a Solid State Drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 234 may be functionally connected to the electronic device 200 through various interfaces. According to an embodiment, the electronic device 200 may further include a storage device (or storage medium) such as a hard drive.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (for example, Red, Green, and Blue (RGB) sensor) 240H, a biometric sensor 240I, a temperature/humidity sensor 240J, an illumination (light) sensor 240K, and a Ultra Violet (UV) sensor 240M. Additionally or alternatively, the sensor module 240 may include, for example, a E-nose sensor, an electromyography (EMG) sensor, an electroencephalogram (EEG) sensor, an electrocardiogram (ECG) sensor, an Infrared (IR) sensor, an iris sensor, a fingerprint sensor (not illustrated), and the like. The sensor module 240 may further include a control circuit for controlling one or more sensors included in the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which can detect an acoustic wave by a microphone (for example, microphone 288) of the electronic device 200 through an input means generating an ultrasonic signal to identify data and can perform wireless recognition. According to an embodiment, the electronic device 200 receives a user input from an external device (for example, computer or server) connected to the electronic device 200 by using the communication interface220.

The display 260 (for example, display 160) includes a panel 262, a hologram device 264, and a projector 266. The panel 262 may be, for example, a Liquid Crystal Display (LCD) or an Active Matrix Organic Light Emitting Diode (AM-OLED). The panel 262 may be implemented to be, for example, flexible, transparent, or wearable. The panel 262 may be configured by the touch panel 252 and one module. The hologram device 264 shows a stereoscopic image in the air by using interference of light. The projector 266 projects light on a screen to display an image. For example, the screen may be located inside or outside the electronic device 200. According to an embodiment, the display 260 may further include a control circuit for controlling the panel 262, the hologram device 264, and the projector 266.

The interface 270 includes, for example, a High-Definition Multimedia Interface (HDMI) 272, a Universal Serial Bus (USB) 274, an optical interface 276, and a D-subminiature (D-sub) 278. The interface 270 may be included in, for example, the communication interface 170 illustrated in FIG. 1. Additionally or alternatively, the interface 290 may include, for example, a Mobile High-definition Link (MHL) interface, a Secure Digital (SD) card/Multi-Media Card (MMC), or an Infrared Data Association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, the microphone 288 or the like.

The camera module 291 is a device which can photograph a still image and a video. According to an embodiment, the camera module 291 may include one or more image sensors (for example, a front sensor or a back sensor), an Image Signal Processor (ISP) (not shown) or a flash (for example, an LED or xenon lamp).

The power managing module 295 manages power of the electronic device 200. Although not illustrated, the power managing module 295 may include, for example, a Power Management Integrated Circuit (PMIC), a charger Integrated Circuit (IC), or a battery or fuel gauge.

The PMIC may be mounted to, for example, an integrated circuit or an SoC semiconductor. A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery fuel gauge measures, for example, a remaining quantity of the battery 296, or a voltage, a current, or a temperature during charging. The battery 296 may store or generate electricity and supply power to the electronic device 200 by using the stored or generated electricity. The battery 296 may include a rechargeable battery or a solar battery. The indicator 297 shows particular statuses of the electronic device 200 or a part (for example, AP 210) of the electronic device 200, for example, a booting status, a message status, a charging status and the like. The motor 298 converts an electrical signal to a mechanical vibration.

Although not illustrated, the electronic device 200 may include a processing unit (for example, GPU) for supporting a module TV. The processing unit for supporting the mobile TV may process, for example, media data according to a standard of Digital Multimedia Broadcasting (DMB), Digital Video Broadcasting (DVB), media flow or the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 3:
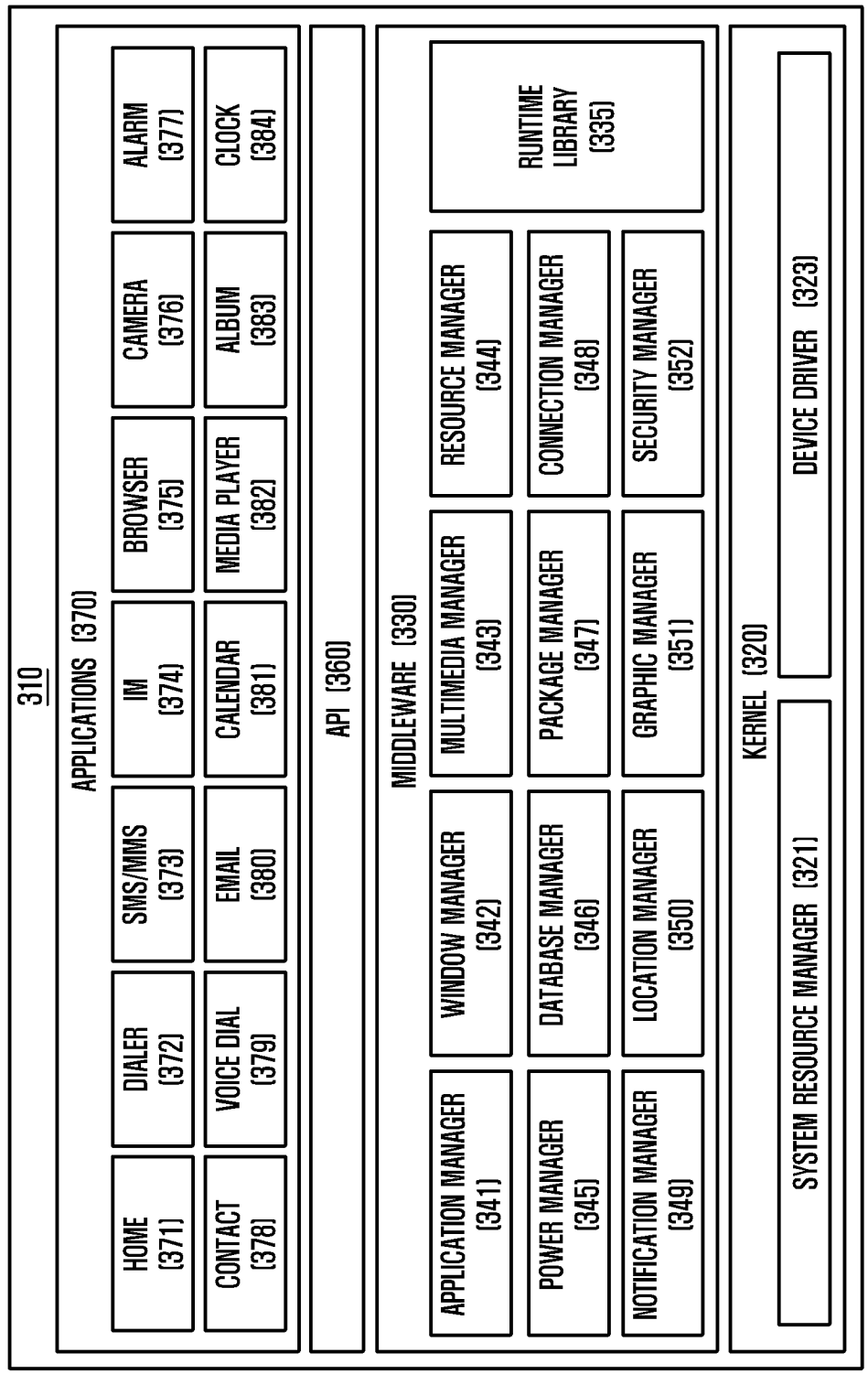
FIG. 3 is a block diagram illustrating a program module according to an embodiment.

FIG. 3 is a block diagram of a programming module 310 according to an embodiment. The programming module 310 (for example, programming module 140) may be included (stored) in the electronic device 100 (for example, memory 130) illustrated in FIG. 1. At least some of the programming module 310 may be formed of software, firmware, hardware, or a combination of at least two of software, firmware, and hardware. The programming module 310 may be executed in the hardware (for example, electronic device 200) to include an Operating System (OS) controlling resources related to the electronic device (for example, electronic device 100) or various applications (for example, applications 370) driving on the OS. For example, the OS may be Android, iOS, Windows, Symbian, Tizen, Bada or the like. Referring to FIG. 3, the programming module 310 includes a kernel 320, a middleware 330, an Application Programming Interface (API) 360, and applications 370.

The kernel 320 (for example, kernel 141) includes a system resource manager 321 and a device driver 323. The system resource manager 321 may include, for example, a process manager, a memory manager, and a file system manager. The system resource manager 321 performs a system resource control, allocation, and recall. The device driver 323 may include, for example, a display driver, a camera driver, a Bluetooth driver, a shared memory driver, a USB driver, a keypad driver, a WiFi driver, and an audio driver. Further, according to an embodiment, the device driver 323 may include an Inter-Process Communication (IPC) driver. The middleware 330 includes a plurality of modules prepared in advance to provide a function required in common by the applications 370. Further, the middleware 330 provides a function through the API 360 to allow the application 370 to efficiently use limited system resources within the electronic device. For example, as illustrated in FIG. 3, the middleware 330 (for example, middleware 143) includes at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352. The runtime library 335 includes, for example, a library module used by a complier to add a new function through a programming language while the application 370 is executed. According to an embodiment, the runtime library 335 executes input and output, management of a memory, a function associated with an arithmetic function and the like. The application manager 341 manages, for example, a life cycle of at least one of the applications 370. The window manager 342 manages GUI resources used on the screen. The multimedia manager 343 detects a format required for reproducing various media files and performs an encoding or a decoding of a media file by using a codec suitable for the corresponding format. The resource manager 344 manages resources such as a source code, a memory, or a storage space of at least one of the applications 370.

The power manager 345 operates together with a Basic Input/Output System (BIOS) to manage a battery or power and provides power information required for the operation. The database manager 346 manages generation, search, and change of a database to be used by at least one of the applications 370. The package manager 347 manages an installation or an update of an application distributed in a form of a package file.

The connection manager 348 manages, for example, a wireless connection such as WiFi or Bluetooth. The notification manager 349 displays or notifies a user of an event such as an arrival message, an appointment, a proximity alarm or the like, in a manner that does not disturb the user. The location manager 350 manages location information of the electronic device. The graphic manager 351 manages a graphic effect provided to the user or a user interface related to the graphic effect. The security manager 352 provides a general security function required for a system security or a user authentication. According to an embodiment, when the electronic device (for example, electronic device 100 or 200) has a call function, the middleware 330 may further include a telephony manager for managing a voice of the electronic device or a video call function. The middleware 330 may generate a new middleware module through a combination of various functions of the aforementioned internal component modules and use the generated new middleware module. The middleware 330 may provide a module specified for each type of operating system to provide a differentiated function. Further, the middleware 330 may dynamically delete some of the conventional components or add new components. Accordingly, some of the components described in the embodiment of the present disclosure may be omitted, replaced with other components having different names but performing similar functions, or other components may be further included.

The API 360 (for example, API 145) is a set of API programming functions, and may be provided with a different configuration according to an operating system. For example, in Android or iOS, a single API set may be provided for each platform. In Tizen, two or more API sets may be provided. The applications 370, which may include an application similar to the application 134, may include, for example, a preloaded application and/or a third party application. The applications 370 may include a home application 371 a dialer application 372, a Short Messaging Service (SMS)/Multimedia Messaging Service (MMS) application 373, an Instant Messaging (IM) application 374, a browser application 375, a camera application 376, an alarm application 377, a contact application 378, a voice dial application 379, an email application 380, a calendar application 381, a media player application 382, an album application 383, and a clock application 384. However, the present embodiment is not limited thereto, and the applications 370 may include any other similar and/or suitable application. At least a part of the programming module 310 can be implemented by commands stored in computer-readable storage media. When the commands are executed by at least one processor, e.g. the AP 210, at least one processor can perform functions corresponding to the commands. The computer-readable storage media may be, for example, the memory 230. At least a part of the programming module 310 can be implemented, e.g. executed, by, for example, the AP 210. At least a part of the programming module 310 may include, for example, a module, a program, a routine, a set of instructions and/or a process for performing at least one function.

The titles of the aforementioned elements of the programming module, e.g. the programming module 310, according to the present disclosure may vary depending on the type of the OS. The programming module according to the present disclosure may include at least one of the aforementioned elements and/or may further include other additional elements, and/or some of the aforementioned elements may be omitted. The operations performed by a programming module and/or other elements according to the present disclosure may be processed through a sequential, parallel, repetitive, and/or heuristic method, and some of the operations may be omitted and/or other operations may be added.

Figure 4:
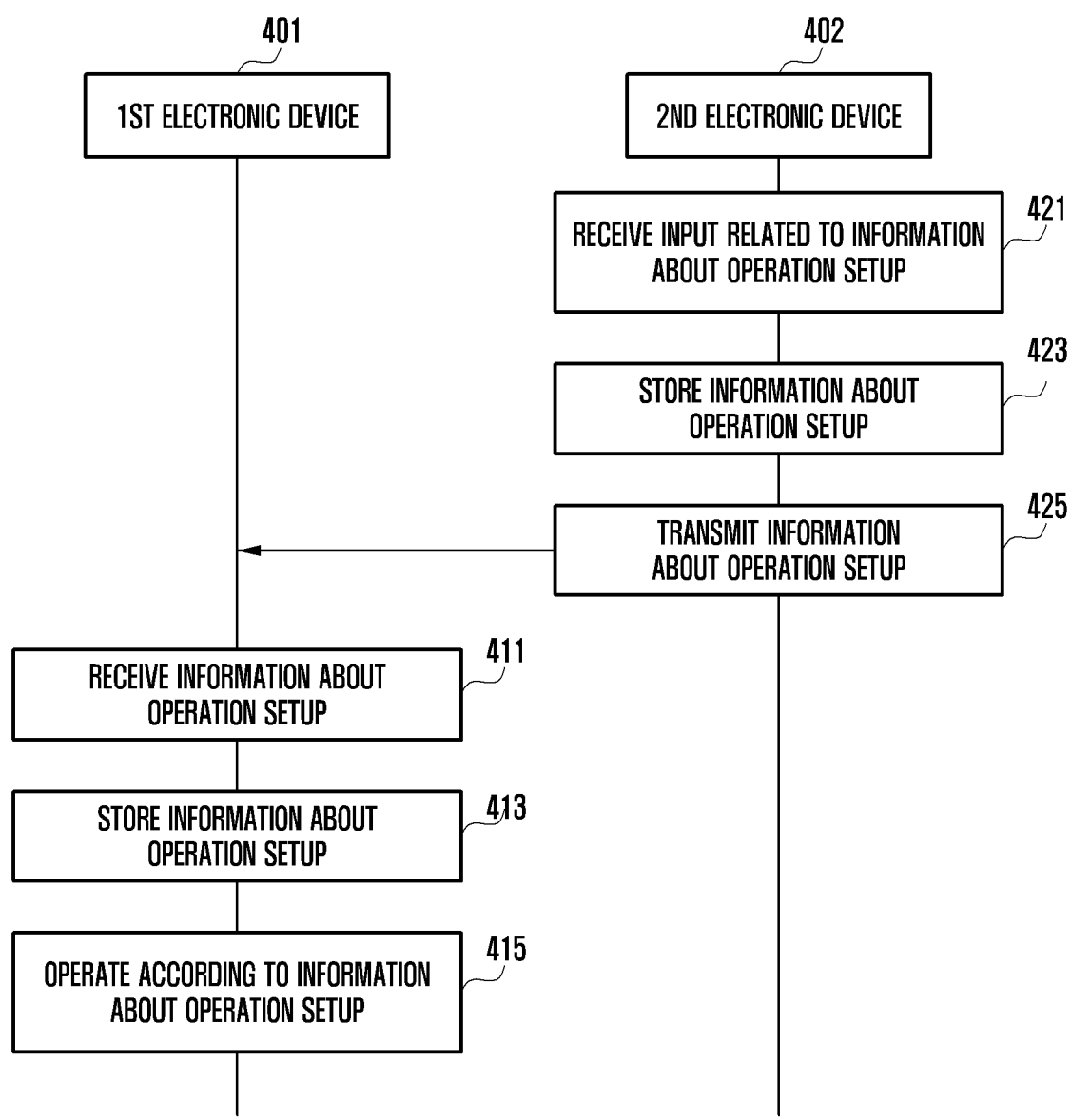
FIG. 4 is a flow diagram illustrating an operation setup between first and second electronic devices according to an embodiment.

FIG. 4 is a flow diagram illustrating an operation setup between first and second electronic devices 401 and 402 according to an embodiment.

The first electronic device 401 may be identical or similar to the electronic device 101 of FIG. 1 or the electronic device 201 of FIG. 2.

Similarly, the second electronic device 402 may be identical or similar to the electronic device 101 of FIG. 1 or the electronic device 201 of FIG. 2.

In addition, the first electronic device 401 may be an IoT device. The second electronic device 402 may be a server or a mobile device.

At operation 421, under the control of a processor (e.g., the processor 210 of FIG. 2), the second electronic device 402 may receive an input related to information about operation setup of the first electronic device 401.

The information about operation setup may include information regarding various operations setups, such as information about the first operation setup, information about the second operation setup, and/or the like. The information about operation setup may be information regarding the operation of at least one of a processor (e.g., the processor 210 of FIG. 2), a memory (e.g., the memory 230 of FIG. 2), and a motion sensor (e.g., the acceleration sensor 240E of FIG. 2) which are included in the first electronic device 401, or information for operating a communication module (e.g., the communication module 220 of FIG. 2) in accordance with a predetermined profile and/or scenario.

In the profiles and/or scenarios, operating cycles of a power saving mode, a discontinuous reception (DRX) mode, and an extended discontinuous reception (eDRX) mode of the first electronic device 401 may be varied, and also location measuring cycles of the first electronic device 401 may be varied.

The second electronic device 402 may previously store or include an application capable of setting or changing the information about operation setup.

When the above application is executed, the second electronic device 402 may display an application execution screen suitable for setting or changing the information about operation setup on its display (e.g., the display 260 of FIG. 2).

On the above application execution screen, the second electronic device 402 may display a user interface to be used for setting one or more predetermined profiles and/or scenarios. Thereby, the user may enter various inputs for setting the information about operation setup.

In addition, on the above user interface, the second electronic device 402 may display one or more icons and/or items corresponding to the one or more profiles and/or scenarios. Also, the second electronic device 402 may receive a user input for selecting the one or more icons and/or items through an input device (e.g., the input device 250 of FIG. 2).

At operation 421, under the control of the processor (e.g., the processor 210 of FIG. 2), the second electronic device 402 may receive an input for selecting the one or more profiles and/or scenarios.

At operation 421, under the control of the processor (e.g., the processor 210 of FIG. 2), in response to the user input that selects a particular profile and/or scenario, the second electronic device 402 may change the operating cycle and the location measuring cycle of the first electronic device 401.

In addition, at operation 421, under the control of the processor (e.g., the processor 210 of FIG. 2), in response to the user input that selects a particular profile and/or scenario, the second electronic device 402 may change the operating cycles of the power saving mode, the DRX mode, and the eDRX mode of the first electronic device 401 and the location measuring cycle of the first electronic device 401.

At operation 423, under the control of the processor (e.g., the processor 210 of FIG. 2), the second electronic device 402 may store the inputted information about the operation setup of the first electronic device 401 in a memory (e.g., the memory 230 of FIG. 2).

At operation 425, under the control of the processor (e.g., the processor 210 of FIG. 2), the second electronic device 402 may transmit the information about the operation setup of the first electronic device 401 to the first electronic device 401 through a communication module (e.g., the communication module 220 of FIG. 2).

At operation 411, the first electronic device 401 may receive the information about the operation setup of the first electronic device 401 through a communication module (e.g., the communication module 220 of FIG. 2).

At operation 413, under the control of a processor (e.g., the processor 210 of FIG. 2), the first electronic device 401 may store the information about operation setup in a memory (e.g., the memory 230 of FIG. 2).

At operation 415, under the control of the processor (e.g., the processor 210 of FIG. 2), the first electronic device 401 may operate in accordance with the information about operation setup.

The processor (e.g., the processor 210 of FIG. 2) and/or the communication module (e.g., the communication module 220 of FIG. 2) included in each of the first electronic device 401 and the second electronic device 402 may be integrated into a communication modem. The processor (e.g., the processor 210 of FIG. 2) and the communication module (e.g., the communication module 220 of FIG. 2) included in the communication modem may be individually or simultaneously operated.

The communication module (e.g., the communication module 220 of FIG. 2) included in the first electronic device 401 and the second electronic device 402 may support LTE category M1 and LTE category NB-1.

Each of the first electronic device 401 and the second electronic device 402 may be capable of operating in a power saving mode, a DRX mode, and/or an eDRX mode.

The power saving mode enables each of the first electronic device 401 and the second electronic device 402 to enter in a sleep state so as to reduce power consumption. For example, in the power saving mode, the processor (e.g., the processor 210 of FIG. 2) and/or the communication module (e.g., the communication module 220 of FIG. 2), as separate components or as part of the communication modem, may be deactivated or be in sleep mode.

The DRX mode and the eDRX mode may extend or change the sleep cycle of the communication module (e.g., the communication module 220 of FIG. 2) when the communication module is in its sleep state.

The first electronic device 401 and the second electronic device 402 may support the power saving mode, the DRX mode, and the eDRX mode. In addition, each of the first and second electronic devices 401 and 402 may transmit a request message containing power saving related parameters such as an active time during the power saving mode and a DRX value for the eDRX mode, receive an acceptance message containing at least one selection parameter indicating power saving, trigger a timer for activating the selected power saving mechanism, define a usage period of the selected power saving mechanism, and receive a paging signal for changing system information during a broadcast control channel (BCCH) change period. In the sleep state, particular functions may be deactivated so as to reduce power consumption.

Figure 5:
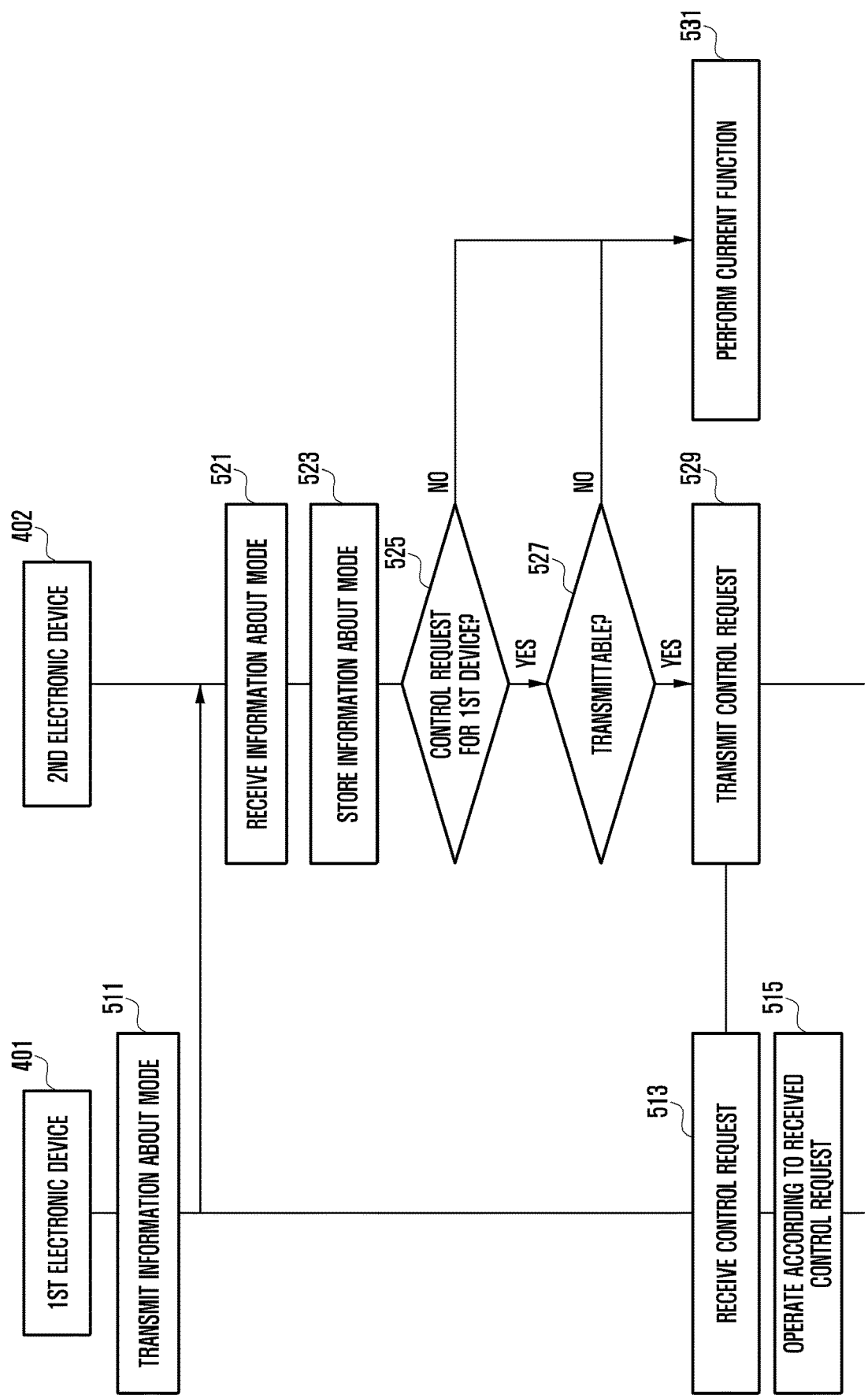
FIG. 5 is a flow diagram illustrating transmission of a control request between first and second electronic devices according to an embodiment.

FIG. 5 is a flow diagram illustrating transmission of a control request between first and second electronic devices 401 and 402 according to an embodiment.

At operation 511, under the control of the processor (e.g., 210 of FIG. 2), the first electronic device 401 may transmit information about its current mode to the second electronic device 402 through the communication module (e.g., 220 of FIG. 2).

For example, the information about its current mode may be information about whether the first electronic device 401 is the power saving mode, the DRX mode, or the eDRX mode.

At operation 521, under the control of the processor (e.g., 210 of FIG. 2), the second electronic device 402 may receive the information about the mode of the first electronic device 401 from the first electronic device 401 through the communication module (e.g., 220 of FIG. 2).

At operation 523, under the control of the processor (e.g., 210 of FIG. 2), the second electronic device 402 may store the received information about the mode of the first electronic device 401 in the memory (e.g., 230 of FIG. 2).

At operation 525, under the control of the processor (e.g., 210 of FIG. 2), the second electronic device 402 may determine whether there is a control request for the first electronic device 401.

If there is no control request for the first electronic device 401 at operation 525, the second electronic device 402 may continue to perform its current function, which may be unrelated to the operations shown in FIG. 5, under the control of the processor (e.g., 210 of FIG. 2) at operation 531.

If there is the control request for the first electronic device 401 at operation 525, the second electronic device 402 may perform operation 527 under the control of the processor (e.g., 210 of FIG. 2).

At operation 527, under the control of the processor (e.g., 210 of FIG. 2), the second electronic device 402 may determine whether the control request for the first electronic device 401 is transmittable to the first electronic device 401.

For example, at operation 527, under the control of the processor (e.g., 210 of FIG. 2), if the first electronic device 401 is in the power saving mode, the second electronic device 402 may determine, based on the information previously received in operation 521, that the control request for the first electronic device 401 is not transmittable to the first electronic device 401.

In another example, at operation 527, under the control of the processor (e.g., 210 of FIG. 2), if the first electronic device 401 is in the DRX mode or the eDRX mode, the second electronic device 402 may determine, based on the information received in operation 521, that the control request for the first electronic device 401 is transmittable to the first electronic device 401.

Thus, at operation 527, under the control of the processor (e.g., 210 of FIG. 2), the second electronic device 402 may determine, based on the stored information about the mode of the first electronic device 401, whether the control request for the first electronic device 401 is transmittable to the first electronic device 401.

If it is determined at operation 527 that the control request for the first electronic device 401 is not transmittable to the first electronic device 401, the second electronic device 402 may continue to perform its current function under the control of the processor (e.g., 210 of FIG. 2) at operation 531.

If it is determined at operation 527 that the control request for the first electronic device 401 is transmittable to the first electronic device 401, the second electronic device 402 may perform operation 529 under the control of the processor (e.g., 210 of FIG. 2).

At operation 529, under the control of the processor (e.g., 210 of FIG. 2), the second electronic device 402 may transmit the control request for the first electronic device 401 to the first electronic device 401 through the communication module (e.g., 220 of FIG. 2).

At operation 513, under the control of the processor (e.g., 210 of FIG. 2), the first electronic device 401 may receive the control request for the first electronic device 401 from the second electronic device 402 through the communication module (e.g., 220 of FIG. 2).

At operation 515, under the control of the processor (e.g., 210 of FIG. 2), the first electronic device 401 may control operations thereof in accordance with the received control request for the first electronic device 401.

Figure 6:
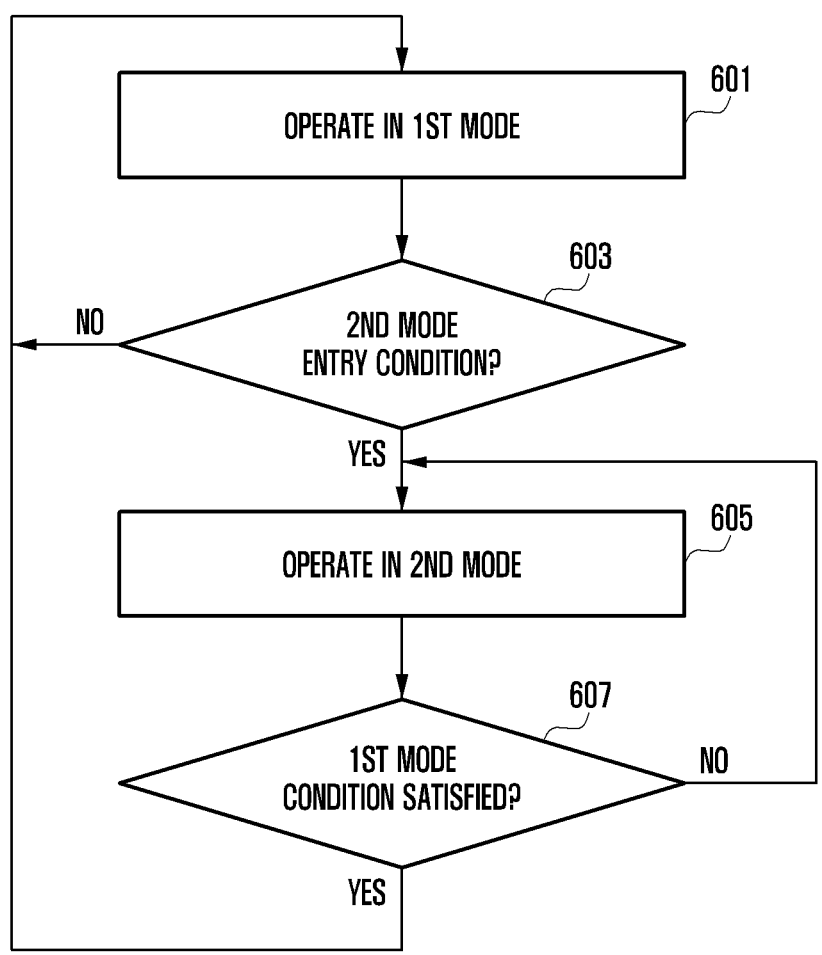
FIG. 6 is a flow diagram illustrating a mode change performed at a first electronic device, based on information about first operation setup, according to an embodiment.

FIG. 6 is a flow diagram illustrating a mode change performed at a first electronic device 401, based on information about first operation setup, according to an embodiment.

At operation 601, under the control of the processor (e.g., 210 of FIG. 2), the first electronic device 401 may operate in a first mode. The first mode may be the DRX mode or the eDRX mode.

At operation 603, under the control of the processor (e.g., 210 of FIG. 2), the first electronic device 401 may determine whether a condition for second mode entry is satisfied. The second mode may be the power saving mode.

If the second mode entry condition is not satisfied at operation 603, the first electronic device 401 may return to operation 601 under the control of the processor (e.g., 210 of FIG. 2).

If the second mode entry condition is satisfied at operation 603, the first electronic device 401 may perform operation 605 under the control of the processor (e.g., 210 of FIG. 2).

The second mode entry condition may be conditions where the motion of the first electronic device 401 is sensed for a certain time period through the motion sensor (e.g., the acceleration sensor 240E of FIG. 2) of the first electronic device 401, where the AP information (e.g., Mac address) of Wi-Fi is detected from a certain area (e.g., home of the user), or where an electronic device having a Bluetooth pairing history (e.g., the second electronic device 402) with the first electronic device 401 is connected through Bluetooth to the first electronic device 401.

At operation 605, under the control of the processor (e.g., 210 of FIG. 2), the first electronic device 401 may enter into the second mode. For example, when entering into the second mode, the first electronic device 401 may release Bluetooth connection.

At operation 607, under the control of the processor (e.g., 210 of FIG. 2), the first electronic device 401 may determine whether a condition to enter back into the first mode is satisfied.

The first mode entry condition may be conditions where the motion of the first electronic device 401 is sensed through the motion sensor (e.g., the acceleration sensor 240E of FIG. 2), or when the motion sensor (e.g., the acceleration sensor 240E of FIG. 2) is booted up at regular intervals.

If the first mode entry condition is satisfied at operation 607, the first electronic device 401 may perform operation 601 under the control of the processor (e.g., 210 of FIG. 2) and operate again in the first mode.

If the first mode entry condition is not satisfied at operation 607, the first electronic device 401 may perform operation 605 under the control of the processor (e.g., 210 of FIG. 2) and continue operation in the second mode.

The motion sensor (e.g., the acceleration sensor 240E of FIG. 2) may be booted up in a certain cycle in accordance with the IoT communication standard of Open Connectivity Foundation (OCF).

Figure 7:
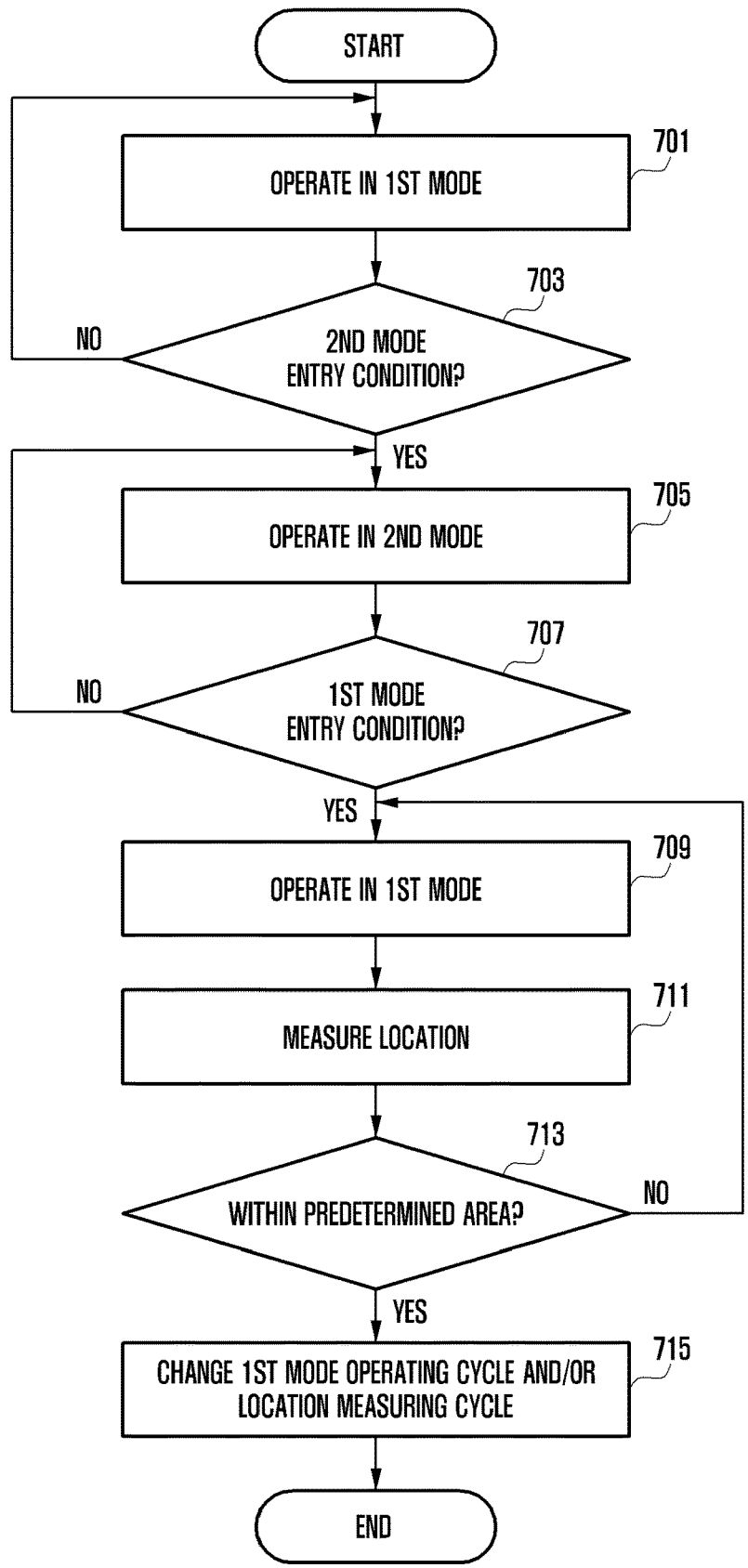
FIG. 7 is a flow diagram illustrating a mode change performed at a first electronic device, based on information about second operation setup, according to an embodiment.

FIG. 7 is a flow diagram illustrating a mode change performed at a first electronic device 401, based on information about second operation setup, according to an embodiment.

At operation 701, under the control of the processor (e.g., 210 of FIG. 2), the first electronic device 401 may operate in a first mode. The first mode may be the DRX mode or the eDRX mode.

At operation 703, under the control of the processor (e.g., 210 of FIG. 2), the first electronic device 401 may determine whether a condition for second mode entry is satisfied. The second mode may be the power saving mode.

If the second mode entry condition is not satisfied at operation 703, the first electronic device 401 may return to operation 701 under the control of the processor (e.g., 210 of FIG. 2).

If the second mode entry condition is satisfied at operation 703, the first electronic device 401 may perform operation 705 under the control of the processor (e.g., 210 of FIG. 2).

The second mode entry condition may be conditions where the motion of the first electronic device 401 is sensed for a certain time period through the motion sensor (e.g., the acceleration sensor 240E of FIG. 2) of the first electronic device 401, where the AP information (e.g., Mac address) of Wi-Fi is detected from a certain area (e.g., home of the user), or where an electronic device having a Bluetooth pairing history (e.g., the second electronic device 402) with the first electronic device 401 is connected through Bluetooth to the first electronic device 401.

At operation 705, under the control of the processor (e.g., 210 of FIG. 2), the first electronic device 401 may enter into the second mode. For example, when entering into the second mode, the first electronic device 401 may release Bluetooth connection.

At operation 707, under the control of the processor (e.g., 210 of FIG. 2), the first electronic device 401 may determine whether a condition to enter back into the first mode is satisfied.

The first mode entry condition may be conditions where the motion of the first electronic device 401 is sensed through the motion sensor (e.g., the acceleration sensor 240E of FIG. 2), or when the motion sensor (e.g., the acceleration sensor 240E of FIG. 2) is booted up at regular intervals.

If the first mode entry condition is satisfied at operation 707, the first electronic device 401 may perform operation 709 under the control of the processor (e.g., 210 of FIG. 2).

At operation 709, under the control of the processor (e.g., 210 of FIG. 2), the first electronic device 401 may operate again in the first mode.

Then, at operation 711, under the control of the processor (e.g., 210 of FIG. 2), the first electronic device 401 may measure the location thereof.

Specifically, using the communication module (e.g., 220 of FIG. 2) under the control of the processor (e.g., 210 of FIG. 2), the first electronic device 401 may measure the location thereof by identifying at least one of the cell ID, Wi-Fi positioning, and global navigation satellite system (GNSS) positioning of the first electronic device 401.

At operation 713, under the control of the processor (e.g., 210 of FIG. 2), the first electronic device 401 may determine, based on the measured location thereof, whether the first electronic device 401 is located within at least one predetermined area.

The at least one predetermined area may be a geo-fence, a communication (e.g., Bluetooth, Wi-Fi, etc.) accessible area, and the like.

If it is determined at operation 713 that the electronic device 401 is located within the at least one predetermined area, the first electronic device 401 may perform operation 715 under the control of the processor (e.g., 210 of FIG. 2).

If it is determined at operation 713 that the electronic device 401 is not located within the at least one predetermined area, the first electronic device 401 may return to operation 709 under the control of the processor (e.g., 210 of FIG. 2).

At operation 715, under the control of the processor (e.g., 210 of FIG. 2), the first electronic device 401 may change the operating cycle of the first mode and/or the location measuring cycle of the first electronic device 401.

The cycle(s) changed at operation 715 may be varied depending on the at least one predetermined area. For example, the operating cycle of the first mode and/or the location measuring cycle of the first electronic device 401 changed with respect to the first area may be different from the operating cycle of the first mode and/or the location measuring cycle of the first electronic device 401 changed with respect to the second area.

Changing the operating cycle of the first mode at operation 715 may include increasing the operating cycle of the first mode used at operation 701 or 709. For example, the operating cycle of the first mode used at operation 701 or 709 may be 2.56 seconds, and the operating cycle of the first mode changed at operation 715 may be 10.24 seconds.

The operating cycle of the first mode used at operation 701 or 709 may be referred to as the first operating cycle, and the operating cycle of the first mode changed at operation 715 may be referred to as the second operating cycle. The second operating cycle may be greater than the first operating cycle.

Changing the location measuring cycle of the first electronic device 401 at operation 715 may include increasing the location measuring cycle of the first electronic device 401 used at operation 711.

The location measuring cycle used at operation 711 may be referred to as the first measuring cycle, and the location measuring cycle changed at operation 715 may be referred to as the second measuring cycle. The second measuring cycle may be greater than the first measuring cycle.

Figure 8:
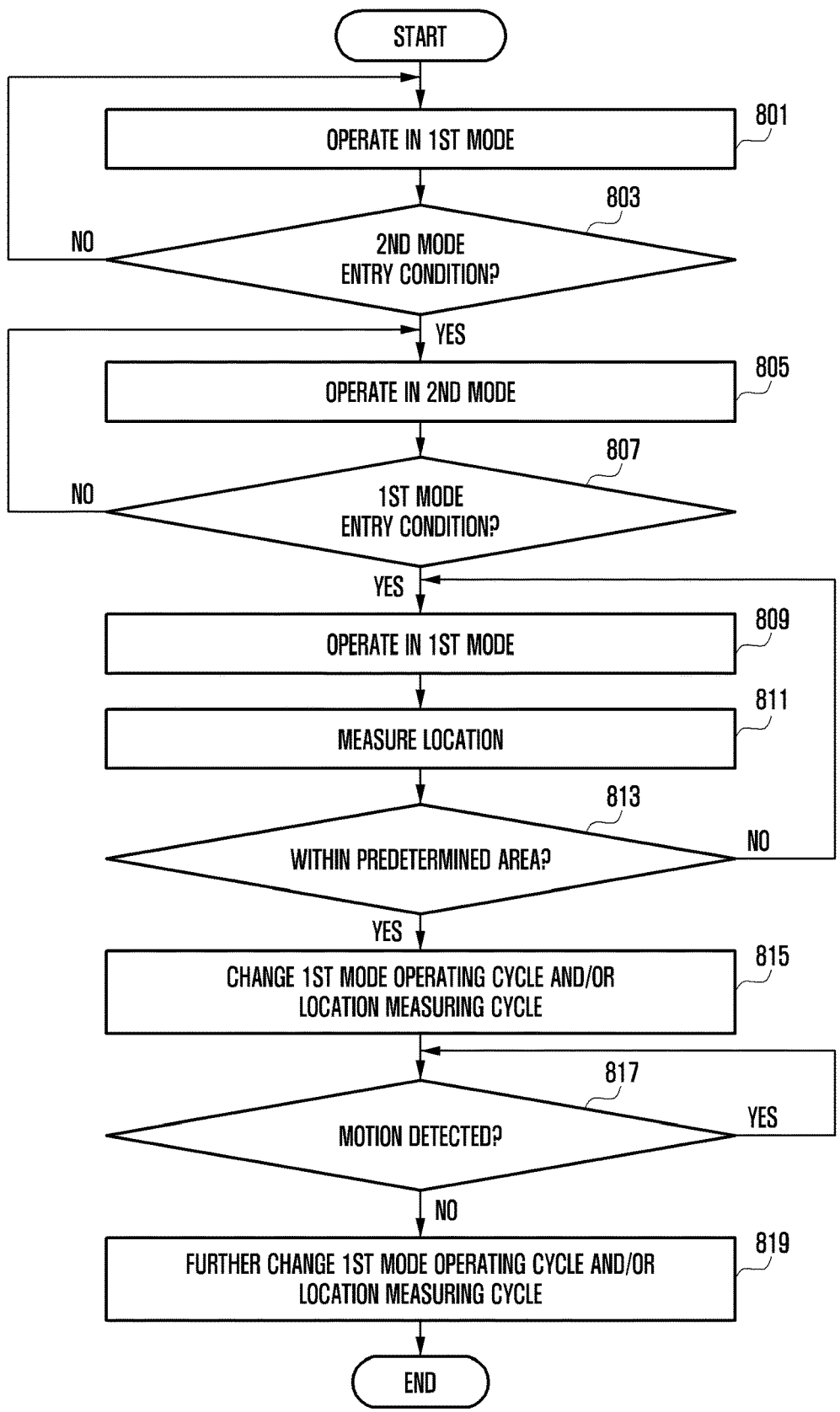
FIG. 8 is a flow diagram illustrating a mode change performed at a first electronic device, based on information about third operation setup, according to an embodiment.

FIG. 8 is a flow diagram illustrating a mode change performed at a first electronic device 401, based on information about third operation setup, according to an embodiment.

At operation 801, under the control of the processor (e.g., 210 of FIG. 2), the first electronic device 401 may operate in a first mode. The first mode may be the DRX mode or the eDRX mode.

At operation 803, under the control of the processor (e.g., 210 of FIG. 2), the first electronic device 401 may determine whether a condition for second mode entry is satisfied. The second mode may be the power saving mode.

If the second mode entry condition is not satisfied at operation 803, the first electronic device 401 may return to operation 801 under the control of the processor (e.g., 210 of FIG. 2).

If the second mode entry condition is satisfied at operation 803, the first electronic device 401 may perform operation 805 under the control of the processor (e.g., 210 of FIG. 2).

The second mode entry condition may be condition where the motion of the first electronic device 401 is sensed for a certain time through the motion sensor (e.g., the acceleration sensor 240E of FIG. 2) of the first electronic device 401, where the AP information (e.g., Mac address) of Wi-Fi is detected from a certain area (e.g., home of the user), or where an electronic device having a Bluetooth pairing history (e.g., the second electronic device 402) with the first electronic device 401 is connected through Bluetooth to the first electronic device 401.

At operation 805, under the control of the processor (e.g., 210 of FIG. 2), the first electronic device 401 may enter into the second mode. For example, when entering into the second mode, the first electronic device 401 may release Bluetooth connection.

At operation 807, under the control of the processor (e.g., 210 of FIG. 2), the first electronic device 401 may determine whether a condition to enter back into the first mode is satisfied.

The first mode entry condition may be conditions where the motion of the first electronic device 401 is sensed through the motion sensor (e.g., the acceleration sensor 240E of FIG. 2), or when the motion sensor (e.g., the acceleration sensor 240E of FIG. 2) is booted up at regular intervals.

If the first mode entry condition is satisfied at operation 807, the first electronic device 401 may perform operation 809 under the control of the processor (e.g., 210 of FIG. 2).

At operation 809, under the control of the processor (e.g., 210 of FIG. 2), the first electronic device 401 may operate again in the first mode.

Then, at operation 811, under the control of the processor (e.g., 210 of FIG. 2), the first electronic device 401 may measure the location thereof.

Specifically, using the communication module (e.g., 220 of FIG. 2) under the control of the processor (e.g., 210 of FIG. 2), the first electronic device 401 may measure the location thereof by identifying at least one of the cell ID, Wi-Fi positioning, and GNSS positioning of the first electronic device 401.

At operation 813, under the control of the processor (e.g., 210 of FIG. 2), the first electronic device 401 may determine, based on the measured location thereof, whether the first electronic device 401 is located within at least one predetermined area.

The at least one predetermined area may be a geo-fence, a communication (e.g., Bluetooth, Wi-Fi, etc.) accessible area, and the like.

If it is determined at operation 813 that the electronic device 401 is located within the at least one predetermined area, the first electronic device 401 may perform operation 815 under the control of the processor (e.g., 210 of FIG. 2).

If it is determined at operation 813 that the electronic device 401 is not located within the at least one predetermined area, the first electronic device 401 may return to operation 809 under the control of the processor (e.g., 210 of FIG. 2).

At operation 815, under the control of the processor (e.g., 210 of FIG. 2), the first electronic device 401 may change the operating cycle of the first mode and/or the location measuring cycle of the first electronic device 401.

The cycle(s) changed at operation 815 may be varied depending on the at least one predetermined area. For example, the operating cycle of the first mode and/or the location measuring cycle of the first electronic device 401 changed with respect to the first area may be different from the operating cycle of the first mode and/or the location measuring cycle of the first electronic device 401 changed with respect to the second area.

Changing the operating cycle of the first mode at operation 815 may include increasing the operating cycle of the first mode used at operation 801 or 809. For example, the operating cycle of the first mode used at operation 801 or 809 may be 2.56 seconds, and the operating cycle of the first mode changed at operation 815 may be 10.24 seconds.

The operating cycle of the first mode used at operation 801 or 809 may be referred to as the first operating cycle, and the operating cycle of the first mode changed at operation 815 may be referred to as the second operating cycle. The second operating cycle may be greater than the first operating cycle.

Changing the location measuring cycle of the first electronic device 401 at operation 815 may include increasing the location measuring cycle of the first electronic device 401 used at operation 811.

The location measuring cycle used at operation 811 may be referred to as the first measuring cycle, and the location measuring cycle changed at operation 815 may be referred to as the second measuring cycle. The second measuring cycle may be greater than the first measuring cycle.

At operation 817, under the control of the processor (e.g., 210 of FIG. 2), the first electronic device 401 may determine whether a motion thereof is detected through the motion sensor (e.g., the acceleration sensor 240E of FIG. 2).

If the motion of the first electronic device 401 is detected through the motion sensor (e.g., the acceleration sensor 240E of FIG. 2) at operation 817, the first electronic device 401 may perform operation 817 again.

If the motion of the first electronic device 401 is not detected for a given time period through the motion sensor (e.g., the acceleration sensor 240E of FIG. 2) at operation 817, the first electronic device 401 may perform operation 819.

At operation 819, under the control of the processor (e.g., 210 of FIG. 2), the first electronic device 401 may further change the operating cycle of the first mode and/or the location measuring cycle of the first electronic device 401.

Further changing the operating cycle of the first mode at operation 819 may include further increasing the operating cycle of the first mode changed at operation 815.

The operating cycle of the first mode changed at operation 815 may be referred to as the second operating cycle, and the operating cycle of the first mode further changed at operation 819 may be referred to as the third operating cycle. The third operating cycle may be greater than the second operating cycle.

Further changing the location measuring cycle of the first electronic device 401 at operation 819 may include further increasing the location measuring cycle of the first electronic device 401 changed at operation 815.

The location measuring cycle changed at operation 815 may be referred to as the second measuring cycle, and the location measuring cycle further changed at operation 819 may be referred to as the third measuring cycle. The third measuring cycle may be greater than the second measuring cycle.

Figure 9:
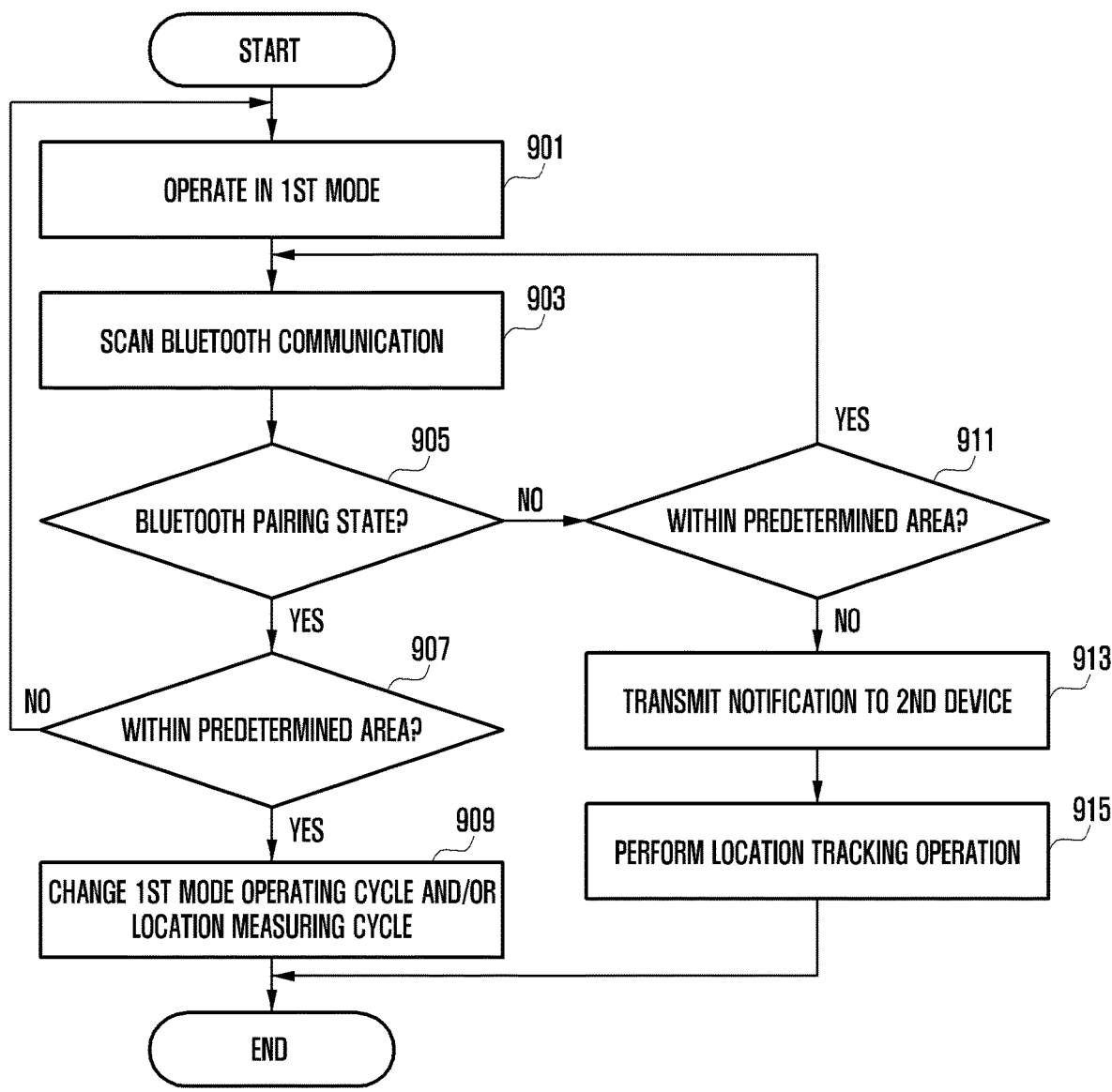
FIG. 9 is a flow diagram illustrating a mode change performed at a first electronic device, based on information about fourth operation setup, according to an embodiment.

FIG. 9 is a flow diagram illustrating a mode change performed at a first electronic device 401, based on information about fourth operation setup, according to an embodiment.

At operation 901, under the control of the processor (e.g., 210 of FIG. 2), the first electronic device 401 may operate in a first mode. The first mode may be the DRX mode or the eDRX mode.

At operation 903, under the control of the processor (e.g., 210 of FIG. 2), the first electronic device 401 may scan Bluetooth communication by controlling the communication module (e.g., 220 of FIG. 2).

At operation 905, under the control of the processor (e.g., 210 of FIG. 2), the first electronic device 401 may determine, based on the result of the Bluetooth scanning operation, whether the first electronic device 401 is in a Bluetooth pairing state.

If it is determined at operation 905 that the first electronic device 401 is in a Bluetooth pairing state, the first electronic device 401 may perform operation 907.

If it is determined at operation 905 that the first electronic device 401 is not in a Bluetooth pairing state, the first electronic device 401 may perform operation 911.

At operation 907, under the control of the processor (e.g., 210 of FIG. 2), the first electronic device 401 may determine, based on the measured location thereof, whether the first electronic device 401 is located within at least one predetermined area.

If it is determined at operation 907 that the electronic device 401 is located within the at least one predetermined area, the first electronic device 401 may perform operation 909 under the control of the processor (e.g., 210 of FIG. 2).

If it is determined at operation 907 that the electronic device 401 is not located within the at least one predetermined area, the first electronic device 401 may return to operation 901 under the control of the processor (e.g., 210 of FIG. 2).

The at least one predetermined area may be a geo-fence, a communication (e.g., Bluetooth, Wi-Fi, etc.) accessible area, and the like.

Using the communication module (e.g., 220 of FIG. 2) under the control of the processor (e.g., 210 of FIG. 2), the first electronic device 401 may measure the location thereof by identifying at least one of the cell ID, Wi-Fi positioning, and GNSS positioning of the first electronic device 401.

At operation 909, under the control of the processor (e.g., 210 of FIG. 2), the first electronic device 401 may change the operating cycle of the first mode and/or the location measuring cycle of the first electronic device 401.

The cycle(s) changed at operation 909 may be varied depending on the at least one predetermined area. For example, the operating cycle of the first mode and/or the location measuring cycle of the first electronic device 401 changed with respect to the first area may be different from the operating cycle of the first mode and/or the location measuring cycle of the first electronic device 401 changed with respect to the second area.

Changing the operating cycle of the first mode at operation 909 may include increasing the operating cycle of the first mode used at operation 901. For example, the operating cycle of the first mode used at operation 901 may be 2.56 seconds, and the operating cycle of the first mode changed at operation 909 may be 10.24 seconds.

The operating cycle of the first mode used at operation 901 may be referred to as the first operating cycle, and the operating cycle of the first mode changed at operation 909 may be referred to as the second operating cycle. The second operating cycle may be greater than the first operating cycle.

Changing the location measuring cycle of the first electronic device 401 at operation 909 may include increasing the location measuring cycle of the first electronic device 401 used at operation 907.

The location measuring cycle used at operation 907 or 911 may be referred to as the first measuring cycle, and the location measuring cycle changed at operation 909 may be referred to as the second measuring cycle. The second measuring cycle may be greater than the first measuring cycle.

At operation 911, under the control of the processor (e.g., 210 of FIG. 2), the first electronic device 401 may determine, based on the measured location thereof, whether the first electronic device 401 is located within at least one predetermined area.

If it is determined at operation 911 that the electronic device 401 is located within the at least one predetermined area, the first electronic device 401 may return to operation 903 under the control of the processor (e.g., 210 of FIG. 2).

If it is determined at operation 911 that the electronic device 401 is not located within the at least one predetermined area, the first electronic device 401 may perform operation 913 under the control of the processor (e.g., 210 of FIG. 2).

At operation 913, under the control of the processor (e.g., 210 of FIG. 2), the first electronic device 401 may transmit a notification to the second electronic device 402. The notification transmitted to the second electronic device 402 may be a notification of loss and may be in the form of an email, a message, an instant message, or any other suitable message.

At operation 915, under the control of the processor (e.g., 210 of FIG. 2), the first electronic device 401 may perform a location tracking operation in real time or in response to a user's request.

Using the communication module (e.g., 220 of FIG. 2) under the control of the processor (e.g., 210 of FIG. 2), the first electronic device 401 may track the location thereof by identifying at least one of the cell ID, Wi-Fi positioning, and GNSS positioning of the first electronic device 401.

Figure 10:
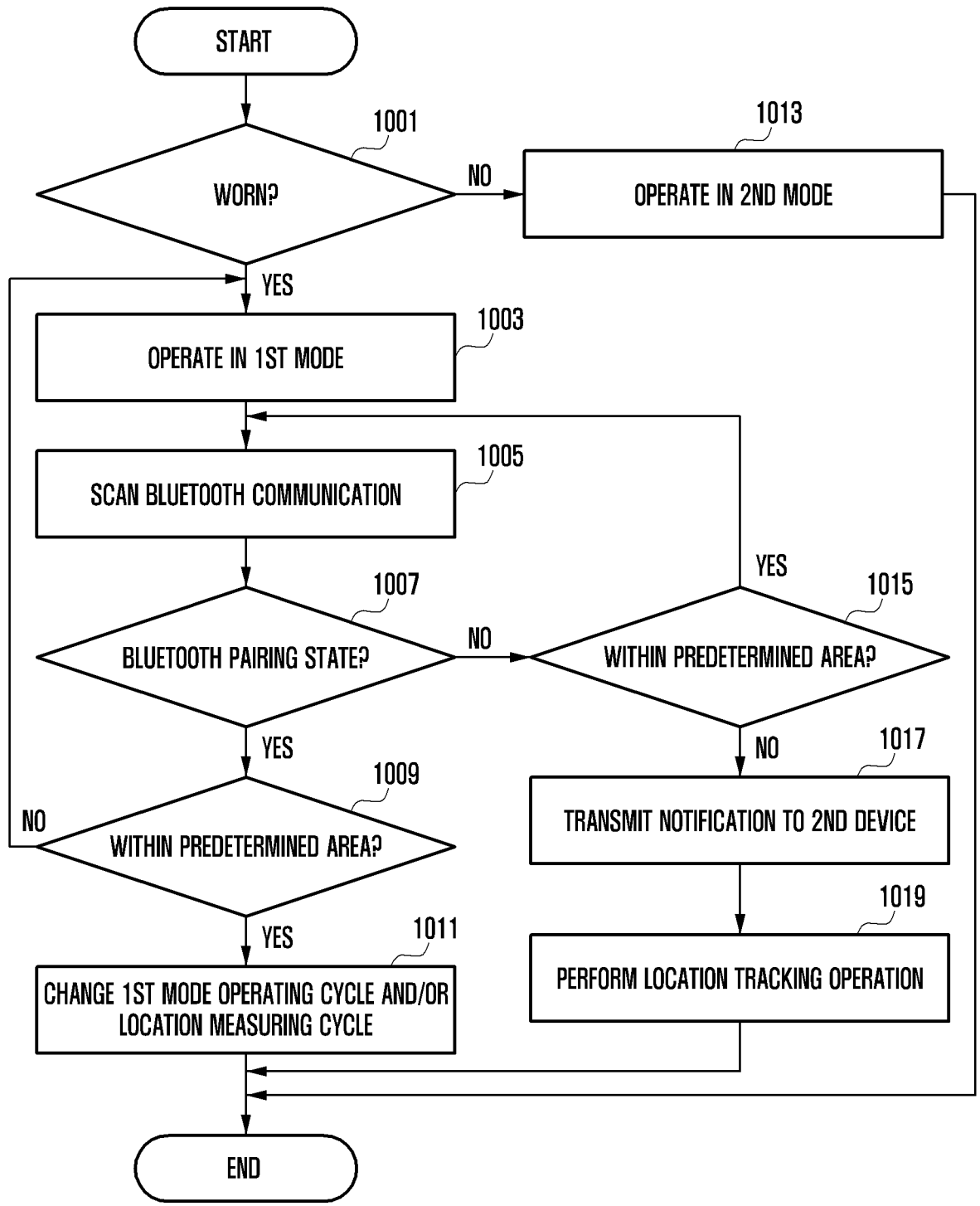
FIG. 10 is a flow diagram illustrating a mode change performed at a first electronic device, based on information about fifth operation setup, according to an embodiment.

FIG. 10 is a flow diagram illustrating a mode change performed at a first electronic device 401, based on information about fifth operation setup, according to an embodiment.

At operation 1001, under the control of the processor (e.g., 210 of FIG. 2), the first electronic device 401 may determine whether the user is wearing the first electronic device 401.

In one embodiment, when a particular motion of the first electronic device 401 is detected through the motion sensor (e.g., the acceleration sensor 240E of FIG. 2), the first electronic device 401 may determine that the user is wearing the first electronic device 401. If no motion of the first electronic device 401 is detected for a certain time period, the first electronic device 401 may determine that the user is not wearing the first electronic device 401.

In another embodiment, when the user's heartbeat is detected through a heart rate module (HRM) sensor (e.g., the biometric sensor 240I of FIG. 2), the first electronic device 401 may determine that the user is wearing the first electronic device 401. Conversely, if no heartbeat is detected for a certain time period, the first electronic device 401 may determine that the user is not wearing the first electronic device 401.

In still another embodiment, the first electronic device 401 may determine whether the user is wearing the first electronic device 401 through the proximity sensor (e.g., 240G of FIG. 2). In other words, the first electronic device 401 may detect the user is proximate to the first electronic device 401.

If it is determined at operation 1001 that the user is wearing the first electronic device 401, the first electronic device 401 may perform operation 1003.

If it is determined at operation 1001 that the user is not wearing the first electronic device 401, the first electronic device 401 may perform operation 1013.

At operation 1013, under the control of the processor (e.g., 210 of FIG. 2), the first electronic device 401 may operate in a second mode. The second mode may be the power saving mode.

At operation 1003, under the control of the processor (e.g., 210 of FIG. 2), the first electronic device 401 may operate in a first mode. The first mode may be the DRX mode or the eDRX mode.

At operation 1005, under the control of the processor (e.g., 210 of FIG. 2), the first electronic device 401 may scan Bluetooth communication by controlling the communication module (e.g., 220 of FIG. 2).

At operation 1007, under the control of the processor (e.g., 210 of FIG. 2), the first electronic device 401 may identify a Bluetooth pairing state, based on the result of the Bluetooth scanning. That is, at operation 1007, under the control of the processor (e.g., 210 of FIG. 2), the first electronic device 401 may determine, based on the result of the Bluetooth scanning, whether the first electronic device 401 is in the Bluetooth pairing state.

If it is determined at operation 1007 that the first electronic device 401 is in a Bluetooth pairing state, the first electronic device 401 may perform operation 1009.

If it is determined at operation 1007 that the first electronic device 401 is not in a Bluetooth pairing state, the first electronic device 401 may perform operation 1015.

At operation 1009, under the control of the processor (e.g., 210 of FIG. 2), the first electronic device 401 may determine, based on the measured location thereof, whether the first electronic device 401 is located within at least one predetermined area.

If it is determined at operation 1009 that the electronic device 401 is located within the at least one predetermined area, the first electronic device 401 may perform operation 1011 under the control of the processor (e.g., 210 of FIG. 2).

If it is determined at operation 1009 that the electronic device 401 is not located within the at least one predetermined area, the first electronic device 401 may return to operation 1003 under the control of the processor (e.g., 210 of FIG. 2).

The at least one predetermined area may be a geo-fence, a communication (e.g., Bluetooth, Wi-Fi, etc.) accessible area, and the like.

Using the communication module (e.g., 220 of FIG. 2) under the control of the processor (e.g., 210 of FIG. 2), the first electronic device 401 may measure the location thereof by identifying at least one of the cell ID, Wi-Fi positioning, and GNSS positioning of the first electronic device 401.

At operation 1011, under the control of the processor (e.g., 210 of FIG. 2), the first electronic device 401 may change the operating cycle of the first mode and/or the location measuring cycle of the first electronic device 401.

The cycle(s) changed at operation 1011 may be varied depending on the at least one predetermined area. For example, the operating cycle of the first mode and/or the location measuring cycle of the first electronic device 401 changed with respect to the first area may be different from the operating cycle of the first mode and/or the location measuring cycle of the first electronic device 401 changed with respect to the second area.

Changing the operating cycle of the first mode at operation 1011 may include increasing the operating cycle of the first mode used at operation 1003. For example, the operating cycle of the first mode used at operation 1003 may be 2.56 seconds, and the operating cycle of the first mode changed at operation 1011 may be 10.24 seconds.

The operating cycle of the first mode used at operation 1003 may be referred to as the first operating cycle, and the operating cycle of the first mode changed at operation 1011 may be referred to as the second operating cycle. The second operating cycle may be greater than the first operating cycle.

Changing the location measuring cycle of the first electronic device 401 at operation 1011 may include increasing the location measuring cycle of the first electronic device 401 used at operation 1009.

The location measuring cycle used at operation 1009 or 1015 may be referred to as the first measuring cycle, and the location measuring cycle changed at operation 1011 may be referred to as the second measuring cycle. The second measuring cycle may be greater than the first measuring cycle.

At operation 1015, under the control of the processor (e.g., 210 of FIG. 2), the first electronic device 401 may determine, based on the measured location thereof, whether the first electronic device 401 is located within at least one predetermined area.

If it is determined at operation 1015 that the electronic device 401 is located within the at least one predetermined area, the first electronic device 401 may return to operation 1005 under the control of the processor (e.g., 210 of FIG. 2).

If it is determined at operation 1015 that the electronic device 401 is not located within the at least one predetermined area, the first electronic device 401 may perform operation 1017 under the control of the processor (e.g., 210 of FIG. 2).

At operation 1017, under the control of the processor (e.g., 210 of FIG. 2), the first electronic device 401 may transmit a notification to the second electronic device 402.

The notification transmitted to the second electronic device 402 may be a notification of loss and may be in the form of an email, a message, an instant message, or any other suitable message.

At operation 1019, under the control of the processor (e.g., 210 of FIG. 2), the first electronic device 401 may perform a location tracking operation in real time or in response to a user's request.

Using the communication module (e.g., 220 of FIG. 2) under the control of the processor (e.g., 210 of FIG. 2), the first electronic device 401 may track the location thereof by identifying at least one of the cell ID, Wi-Fi positioning, and GNSS positioning of the first electronic device 401.

Figure 11:
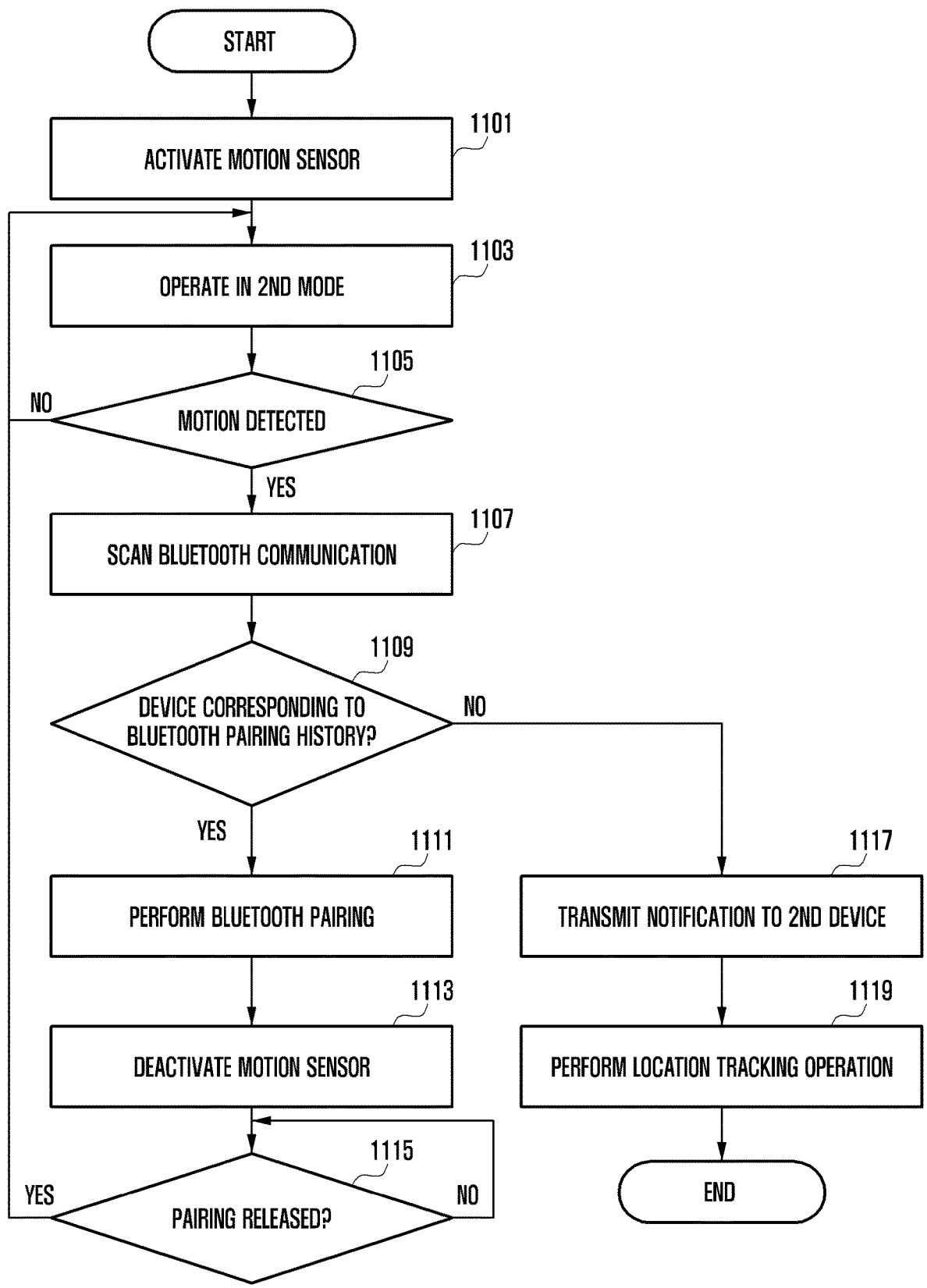
FIG. 11 is a flow diagram illustrating a mode change performed at a first electronic device, based on information about sixth operation setup, according to an embodiment.

FIG. 11 is a flow diagram illustrating a mode change performed at a first electronic device 401, based on information about sixth operation setup, according to an embodiments.

At operation 1101, under the control of the processor (e.g., 210 of FIG. 2), the first electronic device 401 may activate its motion sensor (e.g., the acceleration sensor 240E of FIG. 2).

At operation 1103, under the control of the processor (e.g., 210 of FIG. 2), the first electronic device 401 may operate in a second mode. The second mode may be the power saving mode.

At operation 1105, under the control of the processor (e.g., 210 of FIG. 2), the first electronic device 401 may determine whether a motion thereof is detected through the motion sensor (e.g., the acceleration sensor 240E of FIG. 2).

If the motion of the first electronic device 401 is not detected through the motion sensor (e.g., the acceleration sensor 240E of FIG. 2) at operation 1105, the first electronic device 401 may return to operation 1103.

If the motion of the first electronic device 401 is detected through the motion sensor (e.g., the acceleration sensor 240E of FIG. 2) at operation 1105, the first electronic device 401 may perform operation 1107.

At operation 1107, under the control of the processor (e.g., 210 of FIG. 2), the first electronic device 401 may scan Bluetooth communication by controlling the communication module (e.g., 220 of FIG. 2).

At operation 1109, under the control of the processor (e.g., 210 of FIG. 2), the first electronic device 401 may determine, based on the result of the Bluetooth scanning, whether an electronic device having a Bluetooth communication pairing history with the first electronic device 401 is within Bluetooth range.

If it is determined at operation 1109 that such an electronic device is detected, the first electronic device 401 may perform operation 1111 under the control of the processor (e.g., 210 of FIG. 2).

If it is determined at operation 1109 that such an electronic device is not detected, the first electronic device 401 may perform operation 1117 under the control of the processor (e.g., 210 of FIG. 2).

At operation 1111, under the control of the processor (e.g., 210 of FIG. 2), the first electronic device 401 may perform Bluetooth communication pairing with the detected electronic device by controlling the communication module (e.g., 220 of FIG. 2).

At operation 1113, under the control of the processor (e.g., 210 of FIG. 2), the first electronic device 401 may deactivate the motion sensor (e.g., the acceleration sensor 240E of FIG. 2).

At operation 1115, under the control of the processor (e.g., 210 of FIG. 2), the first electronic device 401 may determine whether the Bluetooth communication pairing is released.

If the Bluetooth communication pairing is released at operation 1115, the first electronic device 401 may return to operation 1103 under the control of the processor (e.g., 210 of FIG. 2).

If the Bluetooth communication pairing is not released at operation 1115, the first electronic device 401 may perform operation 1115 again under the control of the processor (e.g., 210 of FIG. 2).

At operation 1117, under the control of the processor (e.g., 210 of FIG. 2), the first electronic device 401 may transmit a notification to the second electronic device 402. The notification transmitted to the second electronic device 402 may be a notification of loss and may be in the form of an email, a message, an instant message, or any other suitable message.

At operation 1119, under the control of the processor (e.g., 210 of FIG. 2), the first electronic device 401 may perform a location tracking operation in real time or in response to a user's request.

Using the communication module (e.g., 220 of FIG. 2) under the control of the processor (e.g., 210 of FIG. 2), the first electronic device 401 may track the location thereof by identifying at least one of the cell ID, Wi-Fi positioning, and GNSS positioning of the first electronic device 401.

Figure 12:
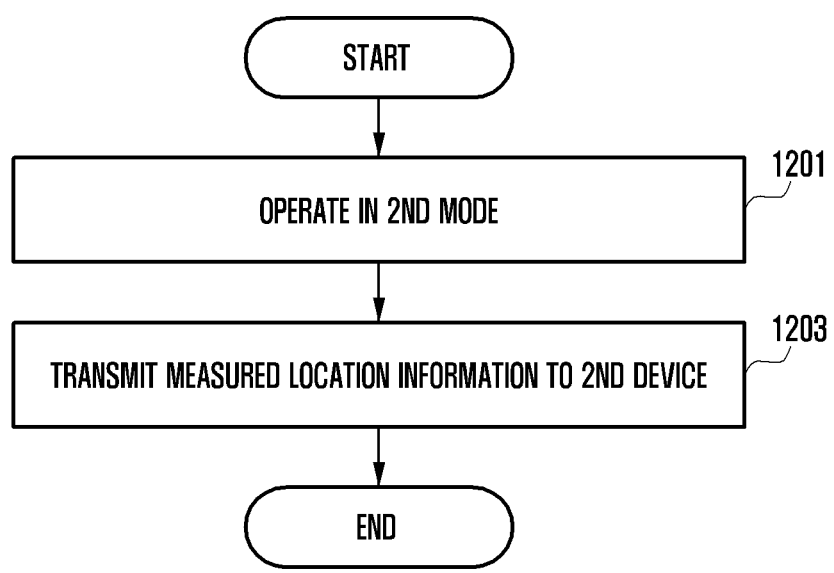
FIG. 12 is a flow diagram illustrating a mode change performed at a first electronic device, based on information about seventh operation setup, according to an embodiment.

FIG. 12 is a flow diagram illustrating a mode change performed at a first electronic device 401, based on information about seventh operation setup, according to an embodiment.

At operation 1201, under the control of the processor (e.g., 210 of FIG. 2), the first electronic device 401 may operate in a second mode. The second mode may be the power saving mode.

At operation 1203, under the control of the processor (e.g., 210 of FIG. 2), the first electronic device 401 may measure the location thereof and then transmit information about the measured location to the second electronic device 402 through the communication module (e.g., 220 of FIG. 2).

Using the communication module (e.g., 220 of FIG. 2) under the control of the processor (e.g., 210 of FIG. 2), the first electronic device 401 may measure the location thereof by identifying at least one of the cell ID, Wi-Fi positioning, and GNSS positioning of the first electronic device 401.

The term "module" used in this disclosure may refer to a certain unit that includes one of hardware, software, and firmware, or any combination thereof. The module may be interchangeably used with unit, logic, logical block, component, or circuit, for example. The module may be the entire unit, or part thereof, which performs one or more particular functions. The module may be formed mechanically or electronically. For example, the module disclosed herein may include at least one of application-specific integrated circuit (ASIC) chip, field-programmable gate arrays (FPGAs), and programmable-logic device, which have been known or are to be developed. At least part of the device (e.g., modules or functions thereof) or method (e.g., operations) according to various embodiments may be implemented as instructions stored, e.g., in the form of a program module, in a computer-readable storage medium. In case instructions are executed by a processor, the processor may perform a particular function corresponding to those instructions. The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction. In addition, the program instructions may include high class language codes, which can be executed in a computer by using an interpreter, as well as machine codes made by a compiler.

Certain aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents

What is claimed is:

1. A communication control method of a portable electronic device, the method comprising:
    wirelessly receiving information about operation setup at the portable electronic device from another portable electronic device;
    operating the portable electronic device according to the received information, wherein operating the portable electronic device comprises operating the portable electronic device in a first mode having a first operating cycle;
    measuring a location of the portable electronic device;
    based on a result of measuring the location of the portable electronic device, and while in a first measuring cycle, determining whether the portable electronic device is located within at least one predetermined area; and
    changing the first operating cycle of the first mode or the first measuring cycle of the electronic device when the portable electronic device is located within the at least one predetermined area,
    wherein the at least one predetermined area is at least one of a geo-fence and a communication accessible area,
    wherein the received information is set by user input through a user interface of another portable electronic device.

2. The method of claim 1, wherein the changing the first operating cycle of the first mode or the first measuring cycle of the portable electronic device includes changing the first operating cycle of the first mode from the first operating cycle to a second operating cycle, and
    wherein the second operating cycle is greater than the first operating cycle.

3. The method of claim 1, wherein the changing the first operating cycle of the first mode or the first measuring cycle of the portable electronic device includes changing the first measuring cycle of the portable electronic device from the first measuring cycle to a second measuring cycle, and wherein the second measuring cycle is greater than the first measuring cycle.

4. The method of claim 1, further comprising:
continue operating in the first mode having the first operating cycle when the portable electronic device is not located within the at least one predetermined area.

5. The method of claim 1, further comprising:
determining whether a condition for second mode entry is satisfied; and
operating the portable electronic device in a second mode when the condition for second mode entry is satisfied,
wherein the condition for second mode entry condition includes a first condition where a motion of the portable electronic device is sensed for a specific time period through a motion sensor of the portable electronic device, a second condition where access point (AP) information of Wi-Fi is detected from a specific area, or a third condition where an other portable electronic device having a Bluetooth pairing history with the portable electronic device is connected through Bluetooth to the portable electronic device.

6. The method of claim 1, further comprising:
determining whether a condition for first mode entry is satisfied; and
operating the portable electronic device again in the first mode having the first operating cycle when the condition for first mode entry is satisfied,
wherein the condition for first mode entry includes a first condition where a motion of the portable electronic device is sensed for a specific time period through a motion sensor of the portable electronic device, a second condition where access point (AP) information of Wi-Fi is detected from a specific area, a third condition where an other portable electronic device having a Bluetooth pairing history with the portable electronic device is connected through Bluetooth to the portable electronic device, a fourth condition where another motion of the portable electronic device is sensed through the motion sensor, or a fifth condition where the motion sensor is booted up at regular intervals.

7. The method of claim 1, further comprising:
determining whether a motion of the portable electronic device is detected through a motion sensor of the portable electronic device; and
further changing the first operating cycle of the first mode or the first measuring cycle of the portable electronic device when the motion of the portable electronic device is not detected for a specific time period through the motion sensor.

8. The method of claim 7, wherein the further changing the first operating cycle of the first mode or the first measuring cycle of the portable electronic device includes changing the first operating cycle of the first mode to a third operating cycle, and
wherein the third operating cycle is greater than the first operating cycle.

9. The method of claim 7, wherein the further changing the first operating cycle of the first mode or the first measuring cycle of the portable electronic device includes changing the first measuring cycle of the portable electronic device to a third measuring cycle, and
wherein the third measuring cycle is greater than the first measuring cycle.

10. The method of claim 5, wherein the first mode is an extended discontinuous reception (eDRX) mode,
wherein the second mode is a power saving mode,
wherein the first mode enables a communication module of the portable electronic device to be active or inactive, and
wherein the second mode enables a processor of the portable electronic device and the communication module to be in a sleep state.

11. The method of claim 1, further comprising:
changing an operating cycle of the first mode or a measuring cycle of the electronic device when the electronic device receives a control request from the another electronic device.

12. The method of claim 2, further comprising:
determine whether the electronic device is in a Bluetooth pairing state while operating the electronic device in the first mode having the first operating cycle.

13. The method of claim 12, further comprising:
performing Bluetooth pairing while operating with the second operating cycle.

14. Aft portable electronic device comprising:
a motion sensor;
a transceiver receiving information about operation setup at the portable electronic device from another portable electronic device;
a processor; and
a memory storing instructions;
wherein the processor executes the instructions to:
operate the portable electronic device according to the received information, wherein operating the portable electronic device comprises operating the portable electronic device in a first mode having a first operating cycle,
measure a location of the electronic device through the transceiver,
based on a result of measuring the location of the portable electronic device, and while in a first measuring cycle, determine whether the portable electronic device is located within at least one predetermined area, and
change the first operating cycle of the first mode or the first measuring cycle of the portable electronic device when the portable electronic device is located within the at least one predetermined area, and
wherein the at least one predetermined area is at least one of a geo-fence and a communication accessible area, and
wherein the received information is set by user input through a user interface of another portable electronic device.

15. The portable electronic device of claim 14, wherein the wherein the processor further executes instruction to:
change the first operating cycle of the first mode from the first operating cycle to a second operating cycle, and
change the first measuring cycle of the electronic device from the first measuring cycle to a second measuring cycle,
wherein the second operating cycle is greater than the first operating cycle, and
wherein the second measuring cycle is greater than the first measuring cycle.

16. The electronic device of claim 14, wherein the processor further executes instruction to:
determine whether a condition for second mode entry is satisfied, and
operate the portable electronic device in a second mode when the condition for second mode entry is satisfied, and wherein the condition for second mode entry includes a first condition where a motion of the portable electronic device is sensed for a specific time period through the motion sensor, a second condition where access point (AP) information of Wi-Fi is detected from a specific area, or a third condition where an other electronic device having a Bluetooth pairing history with the portable electronic device is connected through Bluetooth to the portable electronic device.

17. The electronic device of claim 14, wherein the processor further executes instruction to:
   determine whether a condition for first mode entry is satisfied, and
   operate the portable electronic device again in the first mode having the first operating cycle when the condition for first mode entry is satisfied, and
   wherein the condition for first mode entry includes a first condition where motion of the portable electronic device is sensed for a specific time period through the motion sensor, a second condition where access point (AP) information of Wi-Fi is detected from a specific area, a third condition where an other electronic device having a Bluetooth pairing history with the portable electronic device is connected through Bluetooth to the electronic device, a fourth condition where the motion of the electronic device is sensed through the motion sensor, or a fifth condition where the motion sensor is booted up at regular intervals.

18. The portable electronic device of claim 14, wherein the processor further executes instruction to:
   determine whether motion of the portable electronic device is detected through the motion sensor, and
   further change the first operating cycle of the first mode or the first measuring cycle of the portable electronic device when motion of the portable electronic device is not detected for a specific time period through the motion sensor.

19. The portable electronic device of claim 16, wherein the first mode is an extended discontinuous reception (eDRX) mode,
   wherein the second mode is a power saving mode,
   wherein the first mode enables a communication module of the portable electronic device to be active or inactive, and
   wherein the second mode enables the processor of the portable electronic device and the communication module to be in a sleep state.

20. An electronic device comprising:
   a transceiver;
   a processor; and
   memory storing instructions, wherein execution of the instructions by the processor cause the processor to:
   operate the electronic device in a first mode having a first operating cycle,
   while operating the electronic device in the first mode having the first operating cycle, scan Bluetooth communication,
   determine, based on a result of the scan, whether the electronic device is in a Bluetooth pairing state,
   measure a location of the electronic device through the transceiver,
   based on a result of measuring the location of the electronic device, and while in a first measuring cycle, determine whether the electronic device is located within at least one predetermined area, and
   change the first operating cycle of the first mode or the first measuring cycle of the electronic device when the electronic device is located within the at least one predetermined area and when the electronic device is in the Bluetooth pairing state.

21. The electronic device of claim 20, wherein the memory further stores instructions that, when executed by the processor, cause the processor to continue to operate the electronic device in the first mode having the first operating cycle when the electronic device is not located within the at least one predetermined area.

22. The electronic device of claim 20, wherein the memory further stores instructions that, when executed by the processor, cause the processor to determine whether the electronic device is located within the at least one predetermined area when the electronic device is not in the Bluetooth pairing state, and to scan the Bluetooth communication when the electronic device is located within the at least one predetermined area.

23. The electronic device of claim 22, wherein the memory further stores instructions that, when executed by the processor, cause the processor to:
   transmit a notification about a state of the electronic device to an other electronic device when the electronic device is not located within the at least one predetermined area, and
   track the location of the electronic device when a location tracking request is received from the other electronic device.

* * * * *